(12) United States Patent
Shimakage

(10) Patent No.: US 10,661,803 B2
(45) Date of Patent: May 26, 2020

(54) VEHICLE TRAVEL CONTROL METHOD AND TRAVEL CONTROL DEVICE

(71) Applicant: Nissan Motor Co., Ltd., Yokohama-shi, Kanagawa (JP)

(72) Inventor: Masayasu Shimakage, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/331,387

(22) PCT Filed: Sep. 9, 2016

(86) PCT No.: PCT/JP2016/076599
§ 371 (c)(1),
(2) Date: Mar. 7, 2019

(87) PCT Pub. No.: WO2018/047291
PCT Pub. Date: Mar. 15, 2018

(65) Prior Publication Data
US 2019/0359215 A1   Nov. 28, 2019

(51) Int. Cl.
*B60W 30/18* (2012.01)
*G05D 1/00* (2006.01)

(52) U.S. Cl.
CPC ..... *B60W 30/18163* (2013.01); *G05D 1/0088* (2013.01); *B60W 2520/10* (2013.01); *B60W 2552/00* (2020.02); *B60W 2552/30* (2020.02); *B60W 2554/801* (2020.02); *B60W 2554/804* (2020.02); *G05D 2201/0213* (2013.01)

(58) Field of Classification Search
CPC ..... B60W 30/18163; B60W 2554/804; B60W 2552/00; B60W 2552/30; B60W 2554/801; B60W 2520/10; G05D 1/0088; G05D 2201/0213
See application file for complete search history.

(56) References Cited

U.S. PATENT DOCUMENTS

| | | | |
|---|---|---|---|
| 2006/0095195 A1* | 5/2006 | Nishimura | B60W 30/16 701/96 |
| 2013/0151058 A1* | 6/2013 | Zagorski | G05D 1/0289 701/23 |
| 2016/0272199 A1 | 9/2016 | Kawahara et al. | |
| 2019/0071077 A1* | 3/2019 | Miyamoto | B60W 30/16 |
| 2019/0187272 A1* | 6/2019 | Nemeth | G01S 13/931 |

FOREIGN PATENT DOCUMENTS

| | | |
|---|---|---|
| JP | 2007148964 A | 6/2007 |
| JP | 2015110403 A | 6/2015 |
| JP | 2016030537 A | 3/2016 |

* cited by examiner

*Primary Examiner* — Sze-Hon Kong
(74) *Attorney, Agent, or Firm* — Young Basile Hanlon & MacFarlane, P.C.

(57) ABSTRACT

During automated or autonomous travel control of a subject vehicle, when a road section including at least one of a curve and a narrow road is present ahead of the subject vehicle and another vehicle is traveling in an adjacent lane to the traveling lane for the subject vehicle, inter-vehicle distance control is executed in which the subject vehicle is controlled to travel with an inter-vehicle distance that is set such that the subject vehicle and the other vehicle do not travel side by side when the subject vehicle travels in the road section.

10 Claims, 17 Drawing Sheets

VEHICLE TRAVEL CONTROL METHOD AND TRAVEL CONTROL DEVICE

TECHNICAL FIELD

The present invention relates to a travel control method and a travel control apparatus that control the travel of a vehicle.

BACKGROUND

A device for warning a degree of potential risk is known which issues a warning in accordance with the level of possibility that a subject vehicle and another vehicle traveling in an adjacent lane come close to each other when the subject vehicle and the other vehicle travel side by side along a curve (Japanese Patent Application JP2007-148964A).

In automated or autonomous travel control, however, a problem may arise that, when the subject vehicle and another vehicle travel side by side along a curve, the driver may feel uneasy.

SUMMARY

A problem to be solved by the present invention is to provide a travel control method and a travel control apparatus that appropriately control the travel of a subject vehicle so as to dissipate the uneasy feeling given to the driver when the subject vehicle travels along a curve or a narrow road in the automated or autonomous travel control.

The present invention solves the above problem in the following manner. When, during the automated or autonomous travel control of the subject vehicle, a road section including at least one of a curve and a narrow road is present ahead of the subject vehicle and another vehicle is traveling in an adjacent lane to the traveling lane for the subject vehicle, the subject vehicle is controlled to travel with an inter-vehicle distance that is set such that the subject vehicle and the other vehicle do not travel side by side when the subject vehicle travels in the road section.

According to the present invention, it is possible to prevent the subject vehicle and another vehicle from traveling side by side when the subject vehicle travels along a curve or a narrow road, and the uneasy feeling given to the driver during the automated or autonomous travel control can therefore be dissipated.

DETAILED DESCRIPTION

Hereinafter, the apparatus and method for controlling the travel of a vehicle according to an embodiment of the present invention will be described with reference to the drawings. In this embodiment, the present invention will be described by exemplifying a travel control apparatus equipped in a vehicle.

Figure 1:
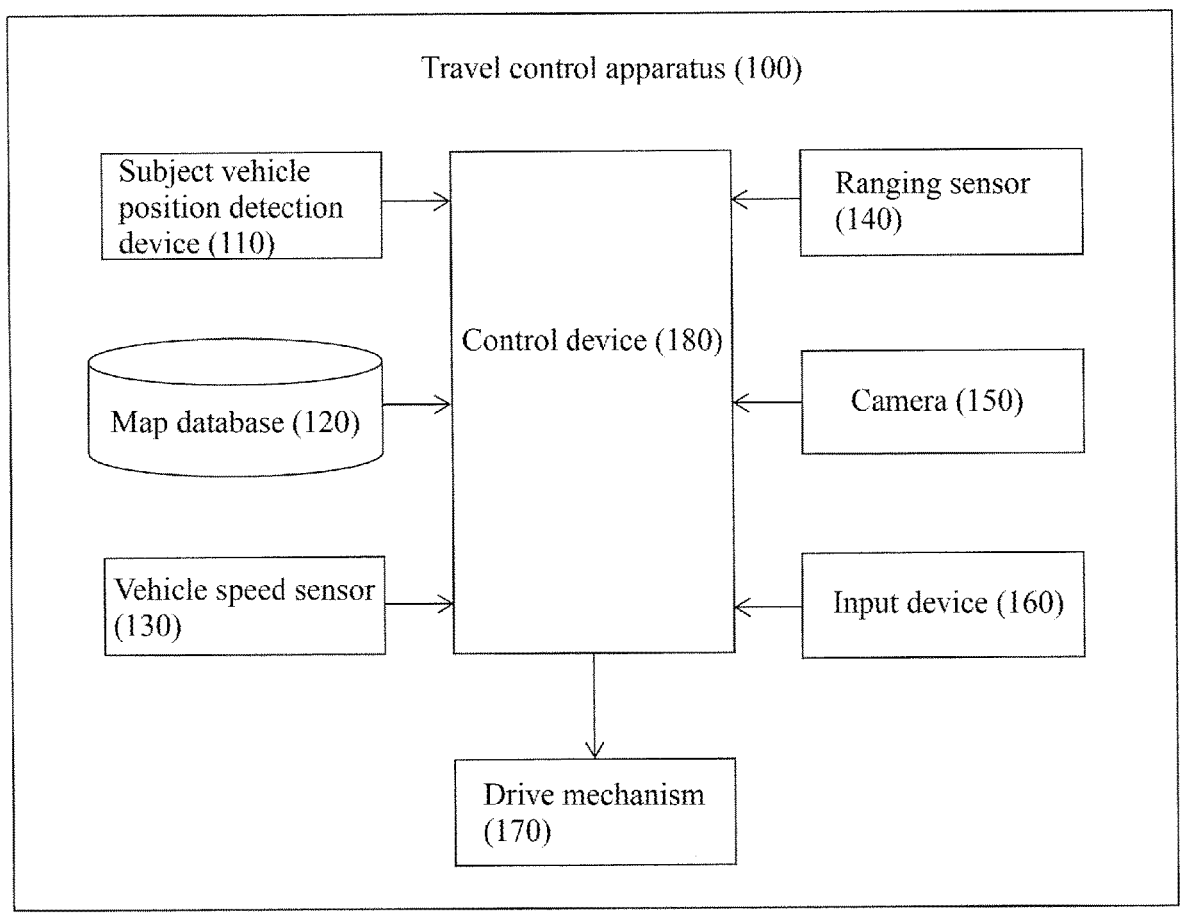
FIG. 1 is a block diagram illustrating a travel control apparatus according to an embodiment of the present invention.

FIG. 1 is a block diagram illustrating the configuration of a travel control apparatus 100 according to the present embodiment. As illustrated in FIG. 1, the travel control apparatus 100 according to the present embodiment includes a subject vehicle position detection device 110, a map database 120, a vehicle speed sensor 130, a ranging sensor 140, a camera 150, an input device 160, a drive mechanism 170, and a control device 180. These components are connected to one another via a controller area network (CAN) or other in-vehicle LAN for mutually exchanging information.

The subject vehicle position detection device 110, which includes a GPS unit, detects radio waves transmitted from a plurality of communication satellites to periodically acquire positional information of the subject vehicle and detects the current position of the subject vehicle on the basis of the acquired positional information of the subject vehicle, angle variation information acquired from a gyro-sensor, and a vehicle speed acquired from the vehicle speed sensor 130. In addition or alternatively, the subject vehicle position detection device 110 can detect the position of the subject vehicle using a well-known map matching technique.

The map database 120 stores map information. The map information stored in the map database 120 includes attribute information regarding a curvature radius R and a road width W of a road at each map coordinate, road shoulder structures, and merging points.

The vehicle speed sensor 130 measures the rotation speed of a drive system, such as a drive shaft, and detects the traveling speed (also referred to as a "vehicle speed," hereinafter) of the subject vehicle on the basis of the measured rotation speed. The vehicle speed information of the subject vehicle detected by the vehicle speed sensor 130 is output to the control device 180.

The ranging sensor 140 detects an obstacle existing around the subject vehicle. The ranging sensor 140 also calculates the relative distance and relative speed between the subject vehicle and the obstacle. Information on the obstacle detected by the ranging sensor 140 is transmitted to the control device 180. Examples of such a ranging sensor 140 include a laser radar and a millimeter wave radar.

The camera 150 captures images of a road and/or an obstacle around the subject vehicle. The image information captured by the camera 150 is transmitted to the control device 180.

The input device 160 is an operation member that can be operated by a driver. In the present embodiment, the driver can operate the input device 160 thereby to set ON/OFF of the automated or autonomous travel control of the vehicle. In the automated or autonomous travel control of the vehicle according to the present embodiment, when a preceding vehicle is present ahead of the subject vehicle, inter-vehicle distance control is performed in which the subject vehicle is controlled to travel so that the inter-vehicle distance between the subject vehicle and the preceding vehicle is maintained at an inter-vehicle distance that is set by the driver, while when no preceding vehicle is present ahead of the subject vehicle, speed control is performed in which the subject vehicle is controlled to travel at a vehicle speed that is set by the driver. In the present embodiment, the driver can operate the input device 160 thereby to set a set vehicle speed (e.g. a specific speed value) of the subject vehicle in the speed control and a set inter-vehicle distance (e.g. any of three stages of a short distance, a medium distance, and a long distance) in the inter-vehicle distance control.

The drive mechanism 170 includes an engine and/or a motor (power system), a brake (braking system), and a steering actuator (steering system) for controlling the subject vehicle to travel in an automated or autonomous manner. In the present embodiment, when performing the automated or autonomous travel control to be described later, the control device 180 controls the operation of the drive mechanism 170.

The control device 180 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as an operating circuit.

The control device 180 executes the programs stored in the ROM using the CPU thereby to achieve the following functions: a subject vehicle information acquisition function of acquiring subject vehicle information regarding the traveling state of the subject vehicle; an ambient information acquisition function of acquiring ambient information regarding obstacles existing around the subject vehicle; a surrounding vehicle specifying function of specifying whether the surrounding vehicle is a forward adjacent vehicle (another vehicle traveling in an adjacent lane) or a preceding vehicle (another vehicle traveling ahead of the subject vehicle in the same lane); a road shape determination function of determining the road shape of a road located ahead of the subject vehicle; a passing determination function of determining whether or not the subject vehicle can pass the forward adjacent vehicle before a curve; an inter-vehicle distance setting function of setting the inter-vehicle distance from the preceding vehicle; and a travel control function of controlling travel of the subject vehicle. These functions of the control device 180 will be described below. It should be noted that "passing" refers to a situation in which a vehicle passes another vehicle traveling in another lane from behind the other vehicle to ahead of the other vehicle without lane change, and is to be distinguished from "overtaking" with lane change.

The control device 180 uses the subject vehicle information acquisition function to acquire subject vehicle information regarding the traveling state of the subject vehicle. For example, the control device 180 can use the subject vehicle information acquisition function to acquire, as the subject vehicle information, the positional information of the subject vehicle from the subject vehicle position detection device 110 and the vehicle speed information of the subject vehicle from the vehicle speed sensor 130.

The control device 180 uses the ambient information acquisition function to acquire ambient information regarding obstacles around the subject vehicle. For example, the control device 180 can use the ambient information acquisition function to acquire the presence or absence of a surrounding vehicle traveling around the subject vehicle as the ambient information from the ranging sensor 140. When a surrounding vehicle is present around the subject vehicle, the control device 180 can use the ambient information acquisition function to acquire information on the position of the surrounding vehicle and the relative distance and relative speed between the subject vehicle and the surrounding vehicle as the ambient information from the ranging sensor 140. The control device 180 can also use the ambient information acquisition function to calculate the absolute vehicle speed of the surrounding vehicle on the basis of the vehicle speed of the subject vehicle acquired using the subject vehicle information acquisition function and the relative speed between the subject vehicle and the surrounding vehicle and acquire the calculated absolute vehicle speed of the surrounding vehicle as the ambient information.

The control device 180 uses the surrounding vehicle specifying function to specify whether another vehicle present ahead of the subject vehicle is a forward adjacent vehicle or a preceding vehicle on the basis of the ambient information acquired using the ambient information acquisition function. For example, the control device 180 uses the surrounding vehicle specifying function to acquire an image captured ahead of the subject vehicle from the camera 150 and detect lane marks located ahead of the subject vehicle. Then, the control device 180 uses the surrounding vehicle specifying function to specify a lane in which a surrounding vehicle traveling ahead of the subject vehicle travels, on the basis of the positional information of the surrounding vehicle included in the ambient information and the lane marks of the road located ahead of the subject vehicle. For example, when the surrounding vehicle traveling ahead of the subject vehicle is traveling in an adjacent lane that is adjacent to the subject vehicle lane, the surrounding vehicle specifying function can serve to specify this surrounding vehicle as a forward adjacent vehicle. When the surrounding vehicle traveling ahead of the subject vehicle is traveling in the subject vehicle lane, the surrounding vehicle specifying function can serve to specify this surrounding vehicle as a preceding vehicle.

The control device 180 uses the road shape determination function to determine whether or not the road located ahead of the subject vehicle is a curve. Details of a method of determining the road shape using the road shape determination function will be described later.

The control device 180 uses the passing determination function to determine whether or not the subject vehicle can pass a forward adjacent vehicle before a curve (at a position closer to the subject vehicle than the starting point of the curve). Details of a passing determination method using the passing determination function will be described later.

The control device 180 uses the inter-vehicle distance setting function to set the inter-vehicle distance between the subject vehicle and the forward adjacent vehicle or preceding vehicle on the basis of the determination result obtained using the passing determination function. Details of a method of setting the inter-vehicle distance using the inter-vehicle distance setting function will also be described later.

The control device 180 uses the travel control function to control the drive mechanism 170 thereby to execute the automated or autonomous travel control in which all or part of the travel of the subject vehicle is performed in an automated or autonomous manner. For example, when a preceding vehicle is present ahead of the subject vehicle, the travel control function in the present embodiment serves to control the operation of the drive mechanism 170 such as the engine and brake in an automated or autonomous manner thereby to execute the inter-vehicle distance control in which the subject vehicle is controlled to travel so that the inter-vehicle distance between the subject vehicle and the preceding vehicle or between the subject vehicle and the forward adjacent vehicle is maintained at an inter-vehicle distance that is set using the inter-vehicle distance setting function. On the other hand, when no preceding vehicle is present ahead of the subject vehicle, the travel control function in the present embodiment serves to control the operation of the drive mechanism 170 such as the engine and brake in an automated or autonomous manner thereby to execute the speed control in which the subject vehicle is controlled to travel at a certain vehicle speed that is set by the driver.

Figure 2:
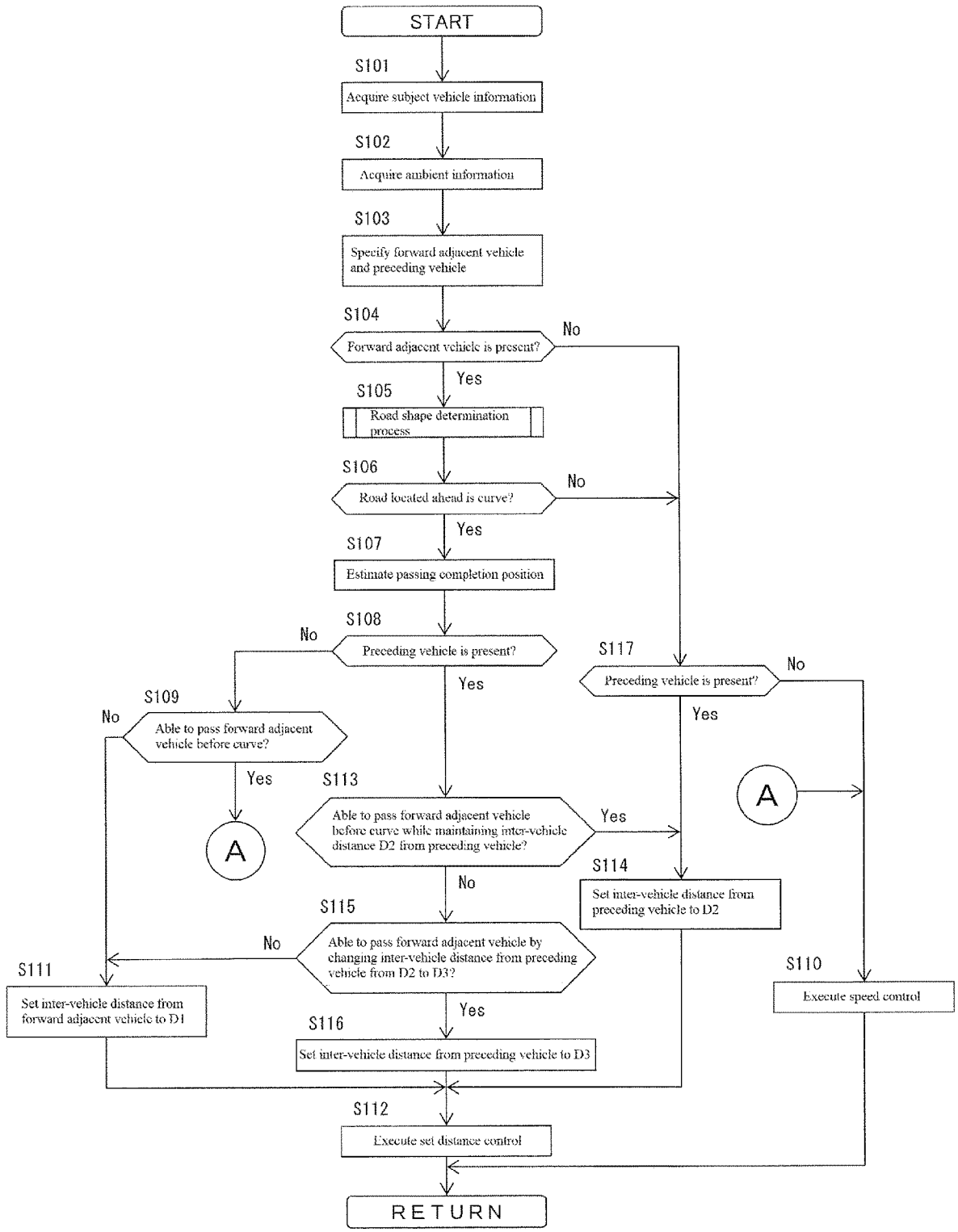
FIG. 2 is a flowchart illustrating a travel control process executed in a control device of FIG. 1.

The travel control process of the present embodiment will then be described. FIG. 2 is a flowchart illustrating the travel control process according to the present embodiment. The travel control process described below is executed by the control device 180. The travel control process described below is started when the ignition switch or power switch is turned on, and repeatedly executed with a predetermined period (e.g. every 10 ms) until the ignition switch or power switch is turned off.

The following description is based on an exemplary scene in which the automated or autonomous travel control is input (turned on) by the driver. That is, in this exemplary scene, the driver sets the automated or autonomous travel control to "ON" via the input device 160 and, thereby, when a preceding vehicle is present ahead of the subject vehicle, the inter-vehicle distance control is performed in which the subject vehicle is controlled to travel in an automated or autonomous manner so that the inter-vehicle distance between the subject vehicle and the preceding vehicle is maintained at an inter-vehicle distance that is set by the driver, while when no preceding vehicle is present ahead of the subject vehicle, the speed control is performed in which the subject vehicle is controlled to travel in an automated or autonomous manner at a set vehicle speed that is set by the driver.

In step S101, the subject vehicle information acquisition function of the control device 180 serves first to perform acquisition of the subject vehicle information regarding the traveling state of the subject vehicle. For example, the subject vehicle information acquisition function can serve to acquire, as the subject vehicle information, the positional information of the subject vehicle from the subject vehicle position detection device 110 and the vehicle speed information of the subject vehicle from the vehicle speed sensor 130.

In step S102, the ambient information acquisition function of the control device 180 serves to perform acquisition of the ambient information regarding obstacles around the subject vehicle. For example, the ambient information acquisition function can serve to acquire the presence or absence of a surrounding vehicle traveling around the subject vehicle as the ambient information. When a surrounding vehicle is present around the subject vehicle, the ambient information acquisition function can serve to acquire information on the relative position of the surrounding vehicle, the relative distance and relative speed between the subject vehicle and the surrounding vehicle, and the absolute vehicle speed of the surrounding vehicle as the ambient information.

In step S103, the surrounding vehicle specifying function serves to specify a forward adjacent vehicle and a preceding vehicle. Specifically, the surrounding vehicle specifying function serves to acquire an image captured ahead of the subject vehicle from the camera 150 and detect lane marks located ahead of the subject vehicle. Then, the surrounding vehicle specifying function serves to determine whether the surrounding vehicle is traveling in the subject vehicle lane or in an adjacent lane adjacent to the subject vehicle lane, on the basis of the positional information of the surrounding vehicle acquired in step S102 and the information on the lane marks located ahead of the subject vehicle, and thereby to specify the surrounding vehicle traveling ahead of the subject vehicle as a preceding vehicle that travels in the subject vehicle lane or a forward adjacent vehicle that travels in the adjacent lane.

In step S104, the passing determination function serves to make a determination as to whether or not a forward adjacent vehicle is present, on the basis of the result obtained in step S103. When no forward adjacent vehicle is present, the process proceeds to step S117. On the other hand, when a forward adjacent vehicle is present, the process proceeds to step S105.

Figure 3:
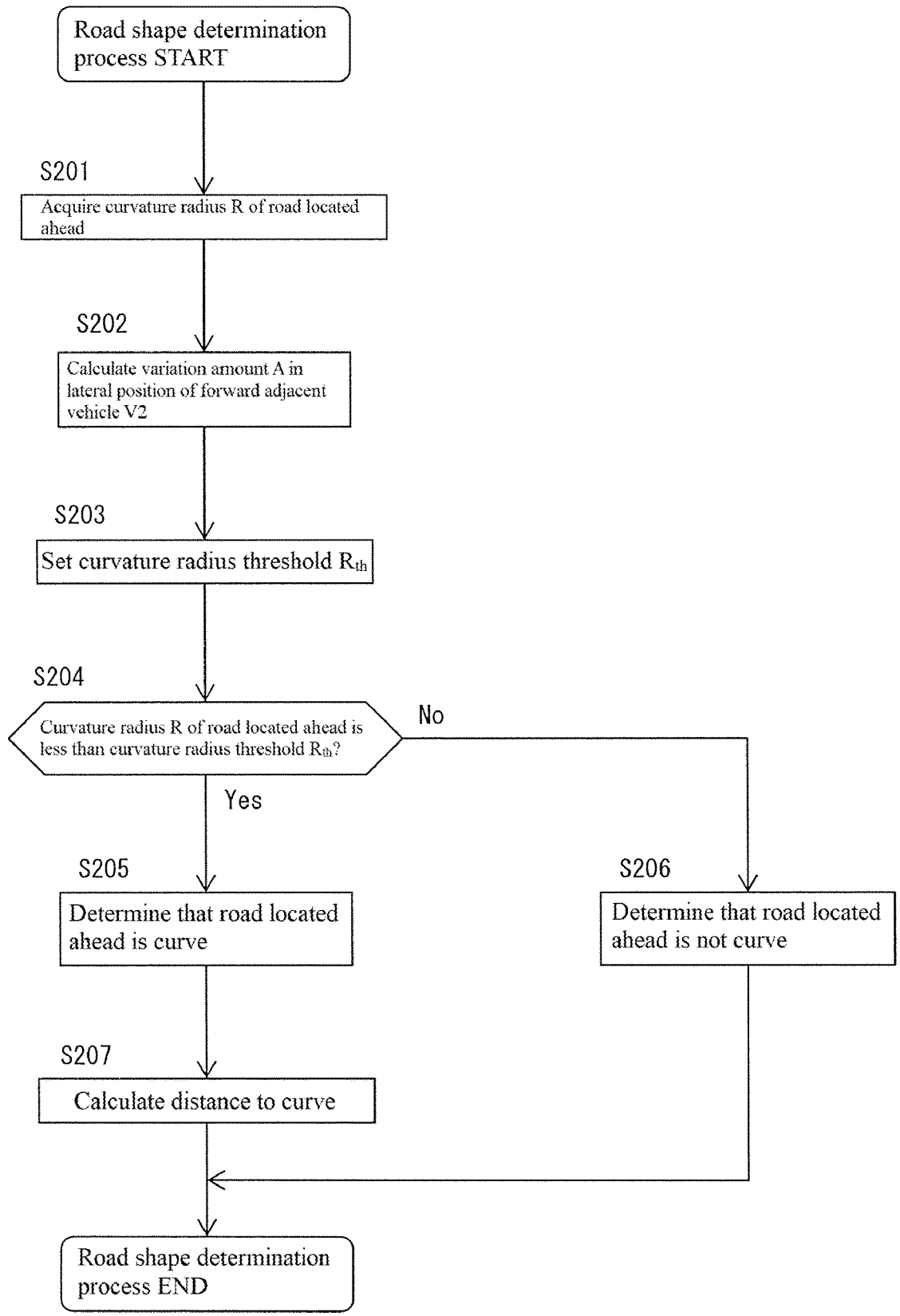
FIG. 3 is a flowchart illustrating the subroutine of a road shape determination process of FIG. 2.

In step S105, the road shape determination function serves to perform a road shape determination process of determining whether or not the road located ahead of the subject vehicle is a curve. FIG. 3 is a flowchart illustrating the subroutine of the road shape determination process performed in step S105. The road shape determination process will be described below with reference to FIG. 3.

In step S201, the road shape determination function serves first to acquire a curvature radius R of the road located ahead of the subject vehicle. For example, as the position of the subject vehicle is detected in step S101 of FIG. 2, the road shape determination function can serve to refer to the map database 120 and thereby to acquire the curvature radius R of the road located ahead of the subject vehicle.

In step S202, the road shape determination function serves to calculate a variation amount A in the lateral position of the forward adjacent vehicle during a certain period on the basis of the ambient information acquired in step S102. In the present embodiment, the travel control process illustrated in FIG. 2 is repeatedly performed, and information on the lateral position (position in the vehicle width direction) of the forward adjacent vehicle, out of the ambient information acquired in step S102, is stored as time-series data in the RAM of the control device 180. The road shape determination function can serve to calculate the variation amount A in the lateral position of the forward adjacent vehicle during a certain period on the basis of the time-series data of the lateral position of the forward adjacent vehicle during the latest certain period.

Figure 4:
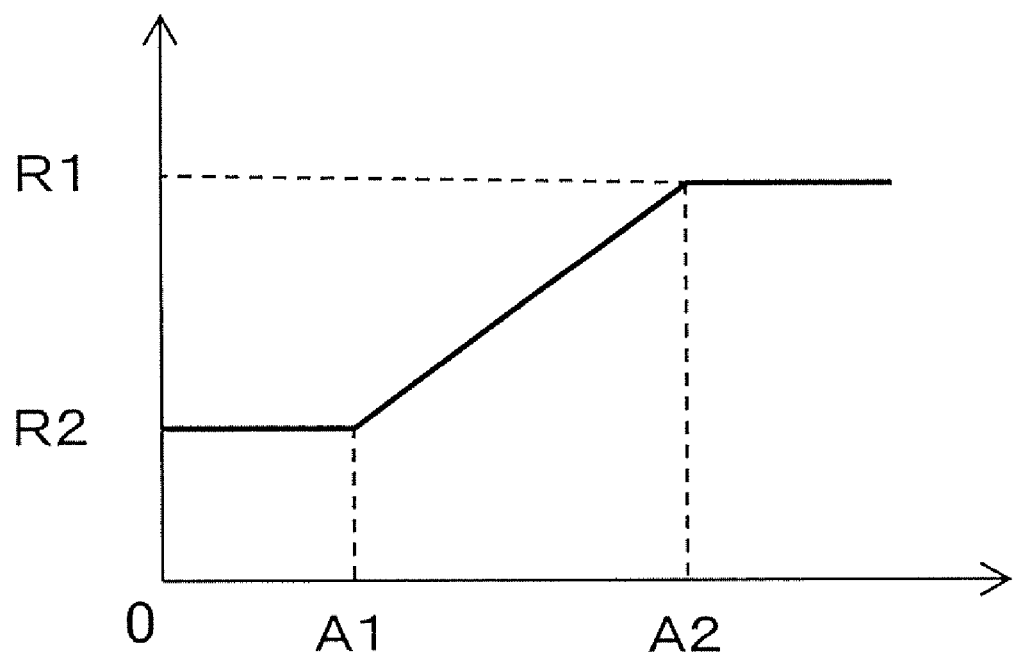
FIG. 4 is a graph (control map) illustrating an example of the relationship between a variation amount in the lateral position of another vehicle (forward adjacent vehicle) and a curvature radius threshold.

In step S203, the road shape determination function serves to set a curvature radius threshold $R_{th}$ on the basis of the variation amount A in the lateral position of the forward adjacent vehicle calculated in step S202. Here, FIG. 4 is a graph (control map) illustrating an example of the relationship between the variation amount A in the lateral position of the forward adjacent vehicle and the curvature radius threshold $R_{th}$. As illustrated in FIG. 4, when the variation amount A in the lateral position of the forward adjacent vehicle is less than A1, the road shape determination function serves to set the curvature radius threshold $R_{th}$ to R2. When the variation amount A in the lateral position of the forward adjacent vehicle V2 is A1 or more and less than A2, the road shape determination function serves to set the curvature radius threshold $R_{th}$ such that the curvature radius threshold $R_{th}$ increases in proportion to the variation amount A in the lateral position of the forward adjacent vehicle within a range from R2 to R1. When the variation amount A in the lateral position of the forward adjacent vehicle is A2 or more, the road shape determination function serves to set the curvature radius threshold $R_{th}$ to R1. A1, A2, R1, and R2 are not particularly limited and can be appropriately set by experiments or the like. Thus, the curvature radius threshold $R_{th}$ is set on the basis of the variation amount A in the lateral position of the forward adjacent vehicle. This is because the curvature radius R of the road located ahead of the subject vehicle, which is acquired with reference to the map database 120, is merely a value on the map database 120 and, in the present embodiment, the degree of fluctuation in the lateral direction when the vehicle actually travels is added to the value on the map database 120. This allows the curvature radius threshold $R_{th}$ to be set larger as the variation amount A in the lateral position of the forward adjacent vehicle (degree of fluctuation in the lateral direction) increases. Thus, the frequency that the road even with the same curvature radius R is determined as a curve becomes high as the variation amount A in the lateral position of the forward adjacent vehicle (degree of fluctuation in the lateral direction) increases.

In step S204, the road shape determination function serves to make a determination as to whether or not the curvature radius R of the road located ahead of the subject vehicle, which is acquired in step S201, is less than the curvature radius threshold $R_{th}$ which is set in step S203. When the curvature radius R of the road located ahead of the subject vehicle is less than the curvature radius threshold $R_{th}$, the process proceeds to step S205, in which the road shape determination function serves to determine that the road located ahead of the subject vehicle is a curve. On the other hand, when the curvature radius R of the road located ahead of the subject vehicle is not less than the curvature radius threshold $R_{th}$, the process proceeds to step S206, in which the road shape determination function serves to determine that the road located ahead of the subject vehicle is not a curve.

The determination made in step S205 that the road located ahead of the subject vehicle is a curve is followed by step S207, in which the road shape determination function serves to calculate a distance from the current position of the subject vehicle to a curve arrival point (starting point of the curve as viewed from the subject vehicle) of the curve located ahead of the subject vehicle. After the above road shape determination process illustrated in FIG. 3 is completed, the process proceeds to step S106 illustrated in FIG. 2.

In step S106 of FIG. 2, the passing determination function serves to make a determination as to whether or not the road located ahead of the subject vehicle is a curve, on the basis of the determination result obtained in the road shape determination process of step S105. In the road shape determination process illustrated in FIG. 3, when a determination is made that the road located ahead of the subject vehicle is a curve (step S205), the process proceeds to step S107, while when a determination is made that the road located ahead of the subject vehicle is not a curve (step S206), the process proceeds to step S117.

The determination that the road located ahead of the subject vehicle is a curve is followed by step S107, in which the passing determination function serves to estimate a passing completion position on the basis of the positional information and vehicle speed information of the forward adjacent vehicle specified in step S103 and the positional information and vehicle speed information of the subject vehicle acquired in step S101. The passing completion position is a position at which the subject vehicle passes the forward adjacent vehicle if the subject vehicle and the forward adjacent vehicle travel at respective current vehicle speeds.

In step S108, the passing determination function serves to determine whether or not a preceding vehicle is present ahead of the subject vehicle. When a determination is made that no preceding vehicle is present, the process proceeds to step S109, while when a determination is made that a preceding vehicle is present, the process proceeds to step S113.

Figure 5:
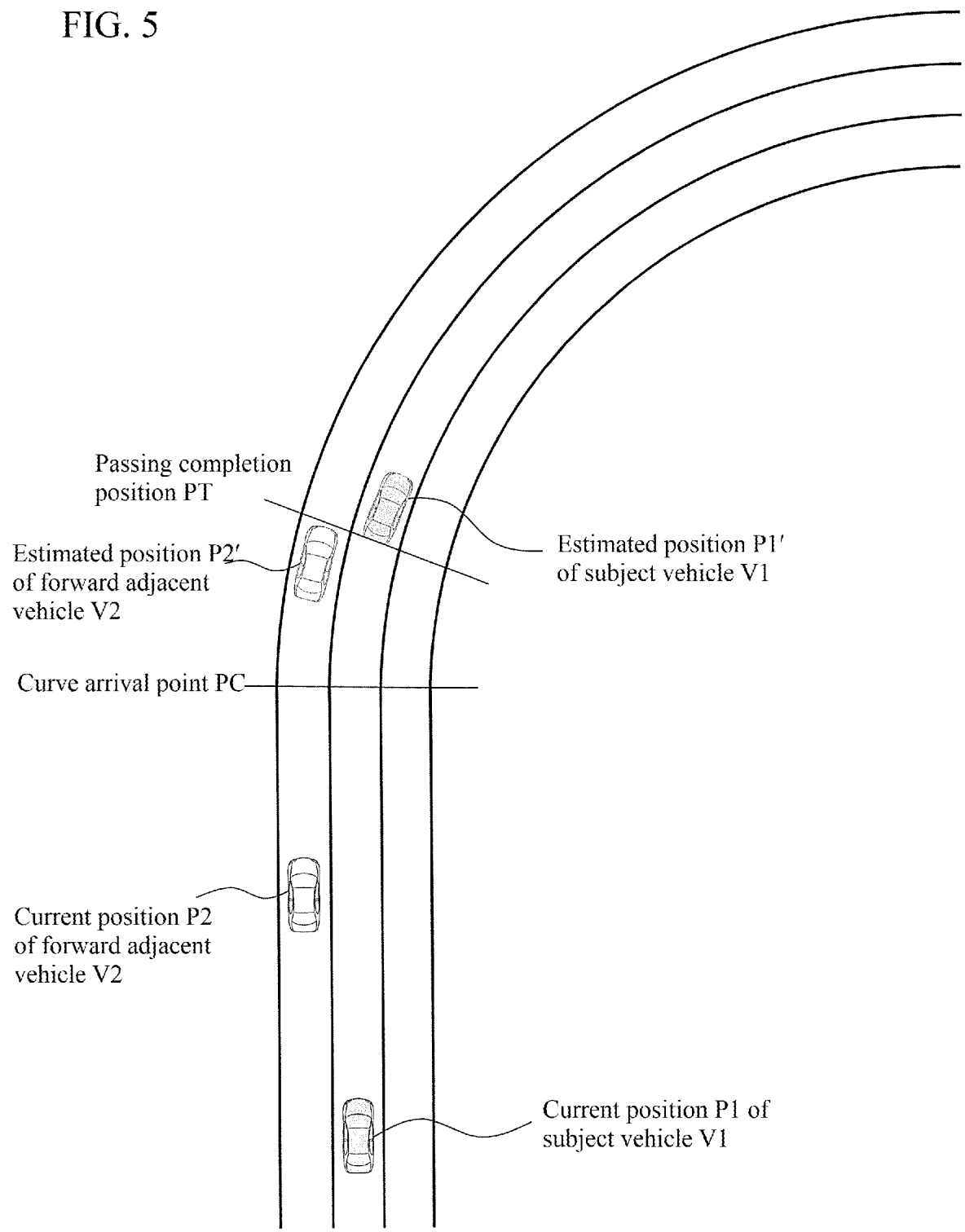
FIG. 5 is a plan view illustrating a scene in which the subject vehicle travels along a curve when no preceding vehicle is present.

The determination that no preceding vehicle is present is followed by step S109, in which the passing determination function serves to determine whether or not the subject vehicle can pass the forward adjacent vehicle at the current traveling speed of the subject vehicle before the curve located ahead. Specifically, as illustrated in FIG. 5, the passing determination function serves to determine whether or not the passing completion position PT estimated in step S107 is located before the curve arrival point PC (starting point of the curve) located ahead of the subject vehicle V1 (whether or not the passing completion position PT estimated in step S107 is located at a position closer to the subject vehicle V1 than the curve arrival point PC (starting point of the curve) located ahead of the subject vehicle V1). The passing completion position PT refers to a point at which the subject vehicle V1 has passed the forward adjacent vehicle V2 and at least the rear end part of the subject vehicle V1 is located ahead of the front end part of the forward adjacent vehicle V2. When the passing completion position PT is located before the curve arrival point PC which is located ahead of the subject vehicle V1, a determination is made that the subject vehicle V1 can pass the forward adjacent vehicle V2 before the curve located ahead. If the passing completion position PT cannot be estimated due to a slower vehicle speed of the subject vehicle V1 than the vehicle speed of the forward adjacent vehicle V2, a determination may be made that the subject vehicle V1 cannot pass the forward adjacent vehicle V2 before the curve located ahead.

The determination that the subject vehicle can pass the forward adjacent vehicle before the curve located ahead is followed by step S110. In step S110, the travel control function serves to perform the speed control in which the subject vehicle is controlled to travel at the set vehicle speed which is set by the driver. Thereafter, the travel control process illustrated in FIG. 2 returns to step S101.

Referring again to step S109, the determination that the subject vehicle cannot pass the forward adjacent vehicle before the curve located ahead when the subject vehicle and the forward adjacent vehicle travel at respective current vehicle speeds is followed by step S111. In step S111, the inter-vehicle distance setting function serves to set the inter-vehicle distance between the subject vehicle and the forward adjacent vehicle to a predetermined distance D1. Then, in step S112, the travel control function serves to perform the inter-vehicle distance control in which the subject vehicle is controlled to travel so that the inter-vehicle distance between the subject vehicle and the forward adjacent vehicle is maintained at the inter-vehicle distance D1 set in step S111. That is, the travel control function serves to control the subject vehicle to travel so that the subject vehicle is separated from the forward adjacent vehicle by the inter-vehicle distance D1 in the traveling direction of the subject vehicle. D1 is not particularly limited and can be appropriately set by experiments or the like. This inter-vehicle distance D1 is an inter-vehicle distance with which at least the subject vehicle and the forward adjacent vehicle (another vehicle) do not travel side by side. The situation that the subject vehicle and the forward adjacent vehicle (another vehicle) do not travel side by side refers to a situation in which, when the forward adjacent vehicle (another vehicle) travels ahead, the front end part of the subject vehicle is located behind the rear end part of the forward adjacent vehicle or a situation in which, when the subject vehicle travels ahead, the front end part of the forward adjacent vehicle is located behind the rear end part of the subject vehicle. Accordingly, the inter-vehicle distance D1 between the subject vehicle and the forward adjacent vehicle may not have to be a fixed distance and may vary within a range of D1≥0. In addition or alternatively, for example, the inter-vehicle distance D1 from the forward adjacent vehicle may be shorter than an inter-vehicle distance D2 or D3 from a preceding vehicle, which will be described later, or may also be longer than the inter-vehicle distance D2 or D3 from the preceding vehicle.

Figure 6:
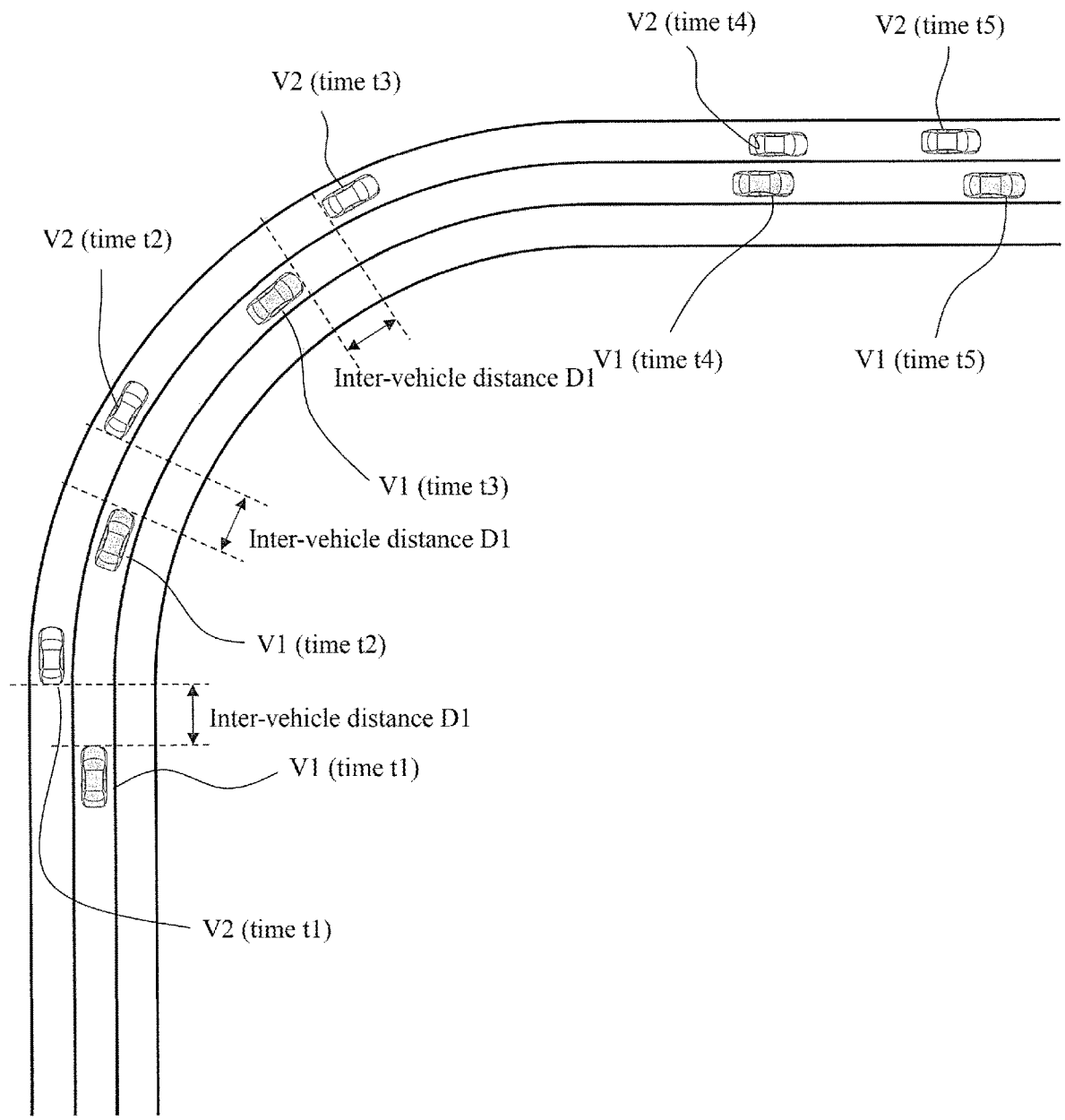
FIG. 6 is a plan view for describing a travel control method for the subject vehicle in the scene illustrated in FIG. 5.

FIG. 5 is a plan view exemplifying a scene in which the subject vehicle V1 travels along a curve when no preceding vehicle is present and FIG. 6 is a plan view for describing a travel control method for the subject vehicle V1 in the scene illustrated in FIG. 5. In the exemplary scene illustrated in FIG. 5, the current position of the subject vehicle V1 is P1, and the current position of the forward adjacent vehicle V2 traveling in the adjacent lane is P2. First, the passing completion position PT at which the subject vehicle V1 passes the forward adjacent vehicle V2 is estimated (step S107) on the basis of the current vehicle speed of the subject vehicle V1, the current vehicle speed of the forward adjacent vehicle V2, the relative distance between the subject vehicle V1 and the forward adjacent vehicle V2, etc. In the exemplary scene illustrated in FIG. 5, no preceding vehicle is present ahead in the traveling lane for the subject vehicle V1 (step S108=No); therefore, a determination is made as to whether or not the subject vehicle V1 can pass the forward adjacent vehicle V2 before the curve located ahead of the subject vehicle V1 (step S109). In the exemplary scene illustrated in FIG. 5, the passing completion position PT is located ahead of the curve arrival point PC (at a position farther from the subject vehicle); therefore, a determination is made that the subject vehicle V1 cannot pass the forward adjacent vehicle V2 before the curve located ahead of the subject vehicle V1 (step S109=No). Accordingly, as illustrated in FIG. 6, the inter-vehicle distance between the subject vehicle V1 and the forward adjacent vehicle V2 which are traveling along the curve (distance between the front end part of the subject vehicle V1 and the rear end part of the forward adjacent vehicle V2) is set to D1 (step S111), and the inter-vehicle distance control is performed in which the subject vehicle V1 is controlled to travel so that the subject vehicle V1 is separated from the forward adjacent vehicle V2 by the inter-vehicle distance D1 (step S112). This allows the subject vehicle V1 to travel with the inter-vehicle distance D1 from the forward adjacent vehicle V2, as illustrated in FIG. 6, and the subject vehicle V1 can thus be avoided from traveling side by side with the forward adjacent vehicle V2 when traveling along the curve.

Figure 7:
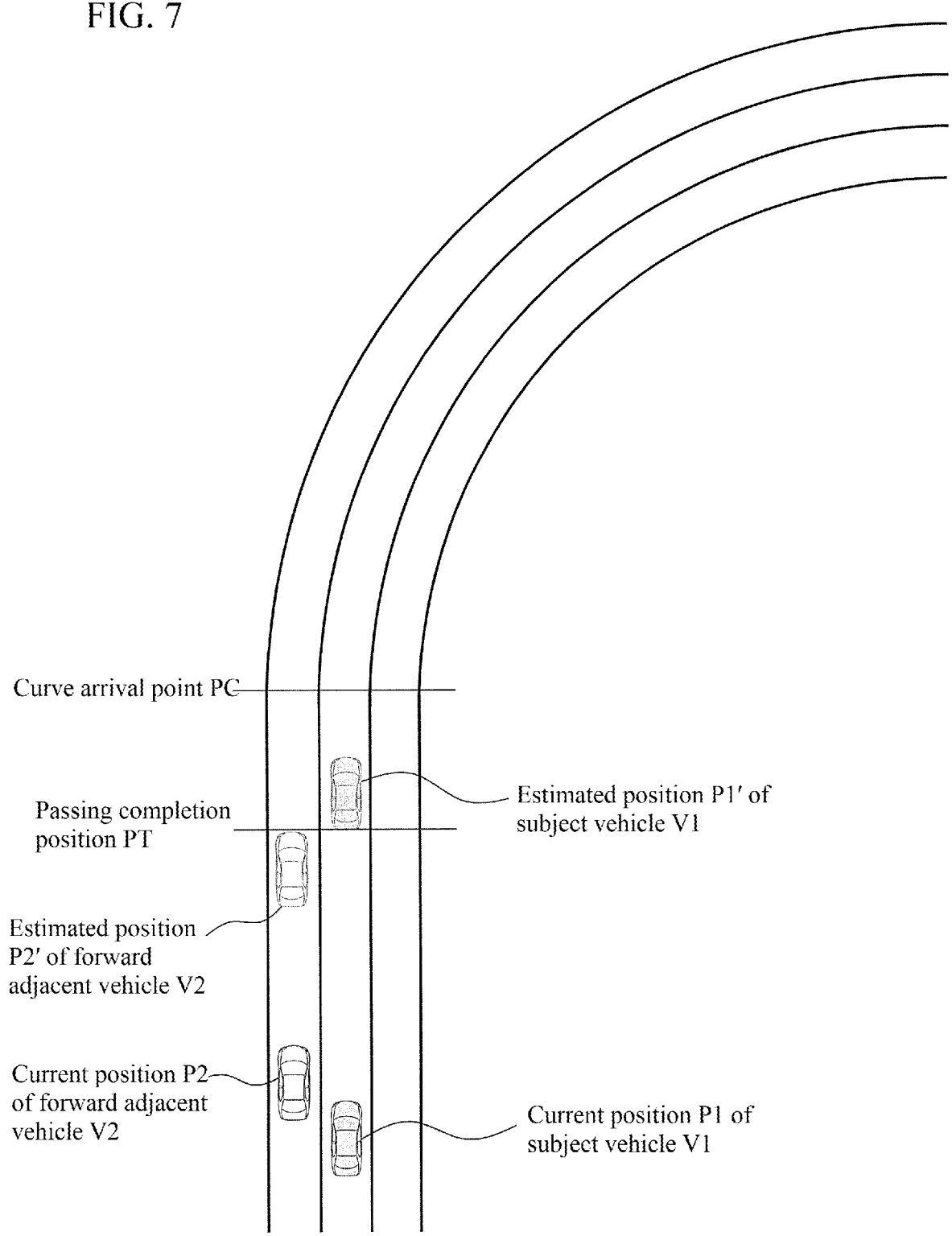
FIG. 7 is a plan view illustrating another scene in which the subject vehicle travels along a curve when no preceding vehicle is present.
Figure 8:
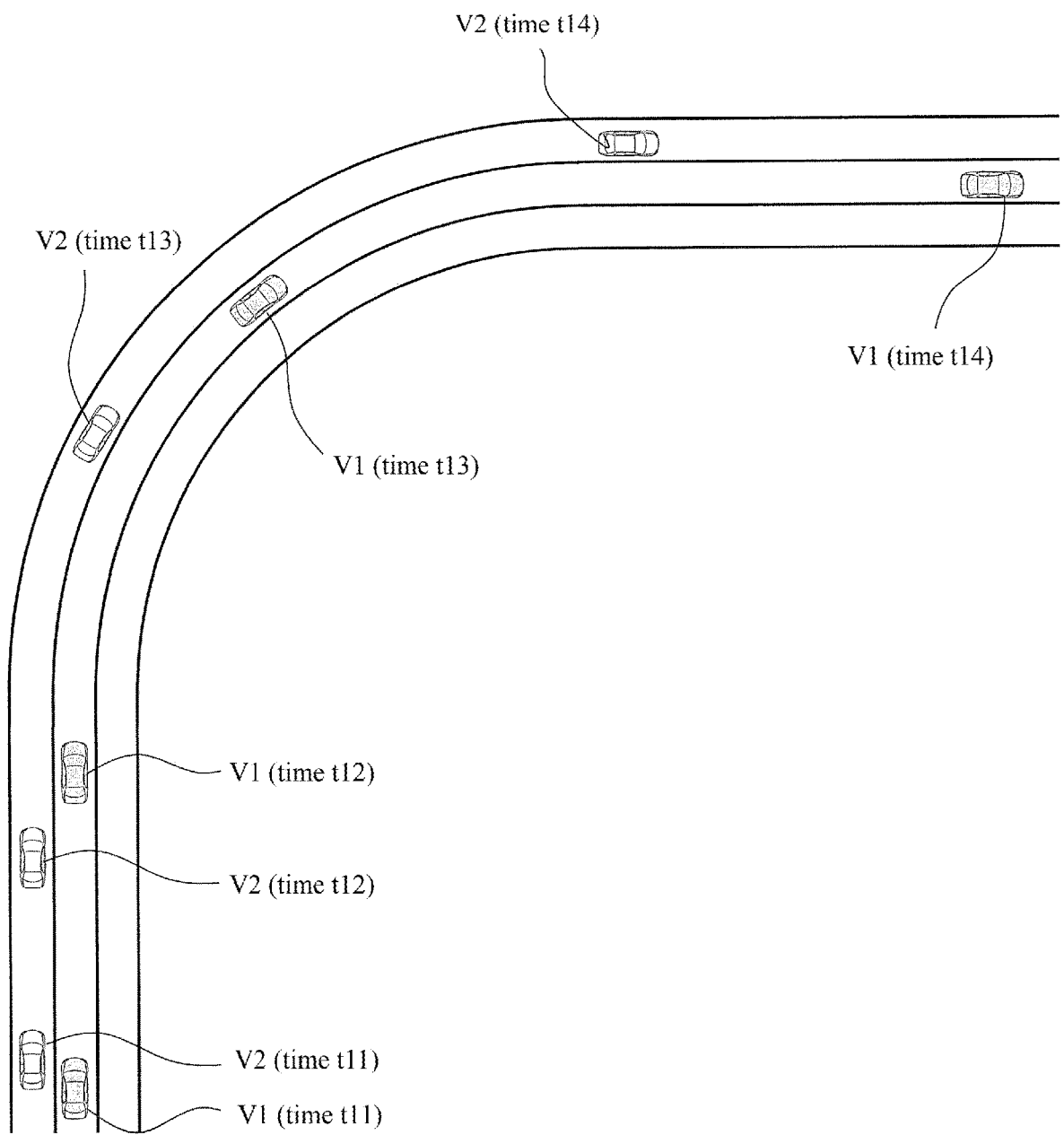
FIG. 8 is a plan view for describing a travel control method for the subject vehicle in the scene illustrated in FIG. 7.

On the other hand, FIG. 7 is a plan view exemplifying another scene in which the subject vehicle V1 travels along a curve when no preceding vehicle is present ahead in the traveling lane for the subject vehicle V1 and FIG. 8 is a plan view for describing a travel control method for the subject vehicle V1 in the scene illustrated in FIG. 7. Also in the exemplary scene illustrated in FIG. 7, as in the example illustrated in FIG. 5, the passing completion position PT at which the subject vehicle V1 passes the forward adjacent vehicle V2 is estimated (step S107) on the basis of the current vehicle speed of the subject vehicle V1, the current vehicle speed of the forward adjacent vehicle V2, the relative distance between the subject vehicle V1 and the forward adjacent vehicle V2, etc. In the exemplary scene illustrated in FIG. 7, no preceding vehicle is present ahead in the traveling lane for the subject vehicle V1 (step S108=No); therefore, a determination is made as to whether or not the subject vehicle V1 can pass the forward adjacent vehicle V2 before the curve located ahead of the subject vehicle V1 (step S109). In the exemplary scene illustrated in FIG. 7, the passing completion position PT is located before the curve arrival point PC (at a position nearer to the subject vehicle V1); therefore, a determination is made that the subject vehicle V1 can pass the forward adjacent vehicle V2 before the curve (step S109=Yes). Accordingly, the speed control is performed in which the subject vehicle V1 is controlled to travel at the set vehicle speed which is set by the driver (step S110). Thus, as illustrated in FIG. 8, the speed control is performed in which the subject vehicle V1 is controlled to travel at the set vehicle speed which is set by the driver, and the subject vehicle V1 can thereby be controlled to pass the forward adjacent vehicle V2 before the curve and travel along the curve without traveling side by side with the forward adjacent vehicle V2 when traveling along the curve.

In the present embodiment, after the inter-vehicle distance control is performed in step S112, the process returns to step S101. Therefore, after the subject vehicle V1 has traveled along the curve as illustrated in FIG. 6, for example, even when the forward adjacent vehicle V2 is present (step S104=Yes) but when the road located ahead is not a curve (step S106=No), the process proceeds to step S117. Then, in step S117, the control device 180 makes a determination as to whether or not a preceding vehicle is present, and when a determination is made that no preceding vehicle is present, the process proceeds to step S110. In step S110, the speed control is performed in which the subject vehicle V1 is controlled to travel at the set vehicle speed which is set by the driver. Thus, in the exemplary scene illustrated in FIG. 6, for example, after the subject vehicle V1 has traveled along the curve, the inter-vehicle distance control of controlling the subject vehicle V1 to travel with the inter-vehicle distance D1 from the forward adjacent vehicle V2 is canceled and the speed control is performed to control the subject vehicle V1 to travel at the set vehicle speed which is set by the driver. This allows the subject vehicle V1 to travel side by side with the forward adjacent vehicle V2 after traveling along the curve, as illustrated in FIG. 6.

Referring again to step S108 of FIG. 2, when a determination is made that a preceding vehicle is present ahead in the traveling lane for the subject vehicle, the process proceeds to step S113. In step S113, the passing determination function serves to determine whether or not the subject vehicle can pass the forward adjacent vehicle before the curve while maintaining an inter-vehicle distance D2 that is preliminarily set between the subject vehicle and the preceding vehicle. In the present embodiment, when a preceding vehicle is present, the inter-vehicle distance control is performed in which the subject vehicle is controlled to travel with the set inter-vehicle distance D2, which is set by the user, from the preceding vehicle, and the current vehicle speed of the subject vehicle is set to a vehicle speed when traveling to follow the preceding vehicle with the inter-vehicle distance D2. The passing determination function therefore serves to estimate the passing completion position PT on the basis of the current vehicle speed of the subject vehicle, the vehicle speed of the forward adjacent vehicle, and the relative distance between the subject vehicle and the forward adjacent vehicle while maintaining the inter-vehicle distance from the preceding vehicle at the inter-vehicle distance D2 which is preliminarily set. Then, the passing determination function serves to determine whether or not the estimated passing completion position PT is located before the curve arrival point PC and thereby to determine whether or not the subject vehicle can pass the forward adjacent vehicle before the curve while maintaining the inter-vehicle distance from the preceding vehicle at the inter-vehicle distance D2 which is preliminarily set. When the subject vehicle can pass the forward adjacent vehicle before the curve while maintaining the inter-vehicle distance from the preceding vehicle at the inter-vehicle distance D2 which is preliminarily set, the process proceeds to step S114, in which the inter-vehicle distance setting function serves to maintain the set inter-vehicle distance D2 for the subject vehicle. On the other hand, when the subject vehicle cannot pass the forward adjacent vehicle before the curve while maintaining the inter-vehicle distance from the preceding vehicle at the inter-vehicle distance D2 which is preliminarily set, the process proceeds to step S115.

In step S115, the passing determination function serves to determine whether or not the subject vehicle can pass the forward adjacent vehicle before the curve when changing the inter-vehicle distance between the preceding vehicle and the subject vehicle to an inter-vehicle distance D3 shorter than the set inter-vehicle distance D2 which is set by the user. For example, the passing determination function serves to estimate the passing completion position PT when the inter-vehicle distance between the subject vehicle and the preceding vehicle is set to the inter-vehicle distance D3, on the basis of the vehicle speed of the subject vehicle when controlled to travel to follow the preceding vehicle with the inter-vehicle distance D3 (<D2), the vehicle speed of the forward adjacent vehicle, and the relative distance between the subject vehicle and the forward adjacent vehicle. Then, the passing determination function serves to determine whether or not the estimated passing completion position PT is located before the curve arrival point PC and thereby to determine whether or not the subject vehicle can pass the forward adjacent vehicle before the curve with the inter-vehicle distance D3 between the subject vehicle and the preceding vehicle. When the subject vehicle can pass the forward adjacent vehicle before the curve with the inter-vehicle distance D3 between the subject vehicle and the preceding vehicle, the process proceeds to step S116, in which the inter-vehicle distance setting function serves to change the inter-vehicle distance between the subject vehicle and the preceding vehicle to D3. Then, in step S112, the inter-vehicle distance control is performed in which the subject vehicle is controlled to travel with the inter-vehicle distance D3 from the preceding vehicle. On the other hand, when the subject vehicle cannot pass the forward adjacent vehicle before the curve even with the inter-vehicle distance D3 between the subject vehicle and the preceding vehicle, the process proceeds to step S111, in which the inter-vehicle distance from the forward adjacent vehicle is set to D1. Then, in step S112, the inter-vehicle distance control is performed in which the subject vehicle is controlled to travel with the inter-vehicle distance D1 from the forward adjacent vehicle.

Figure 9:
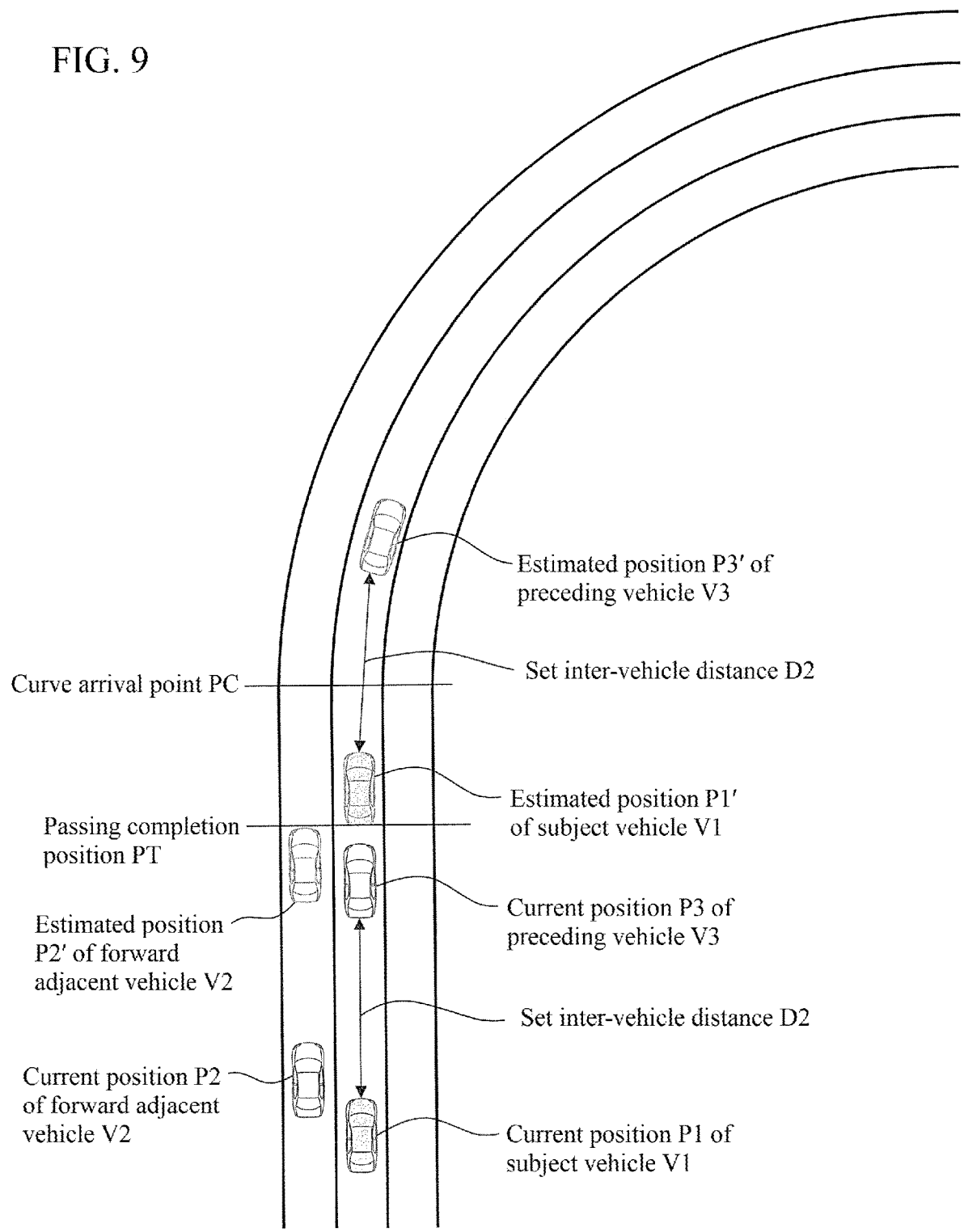
FIG. 9 is a plan view illustrating a scene in which the subject vehicle travels along a curve when a preceding vehicle is present.
Figure 10:
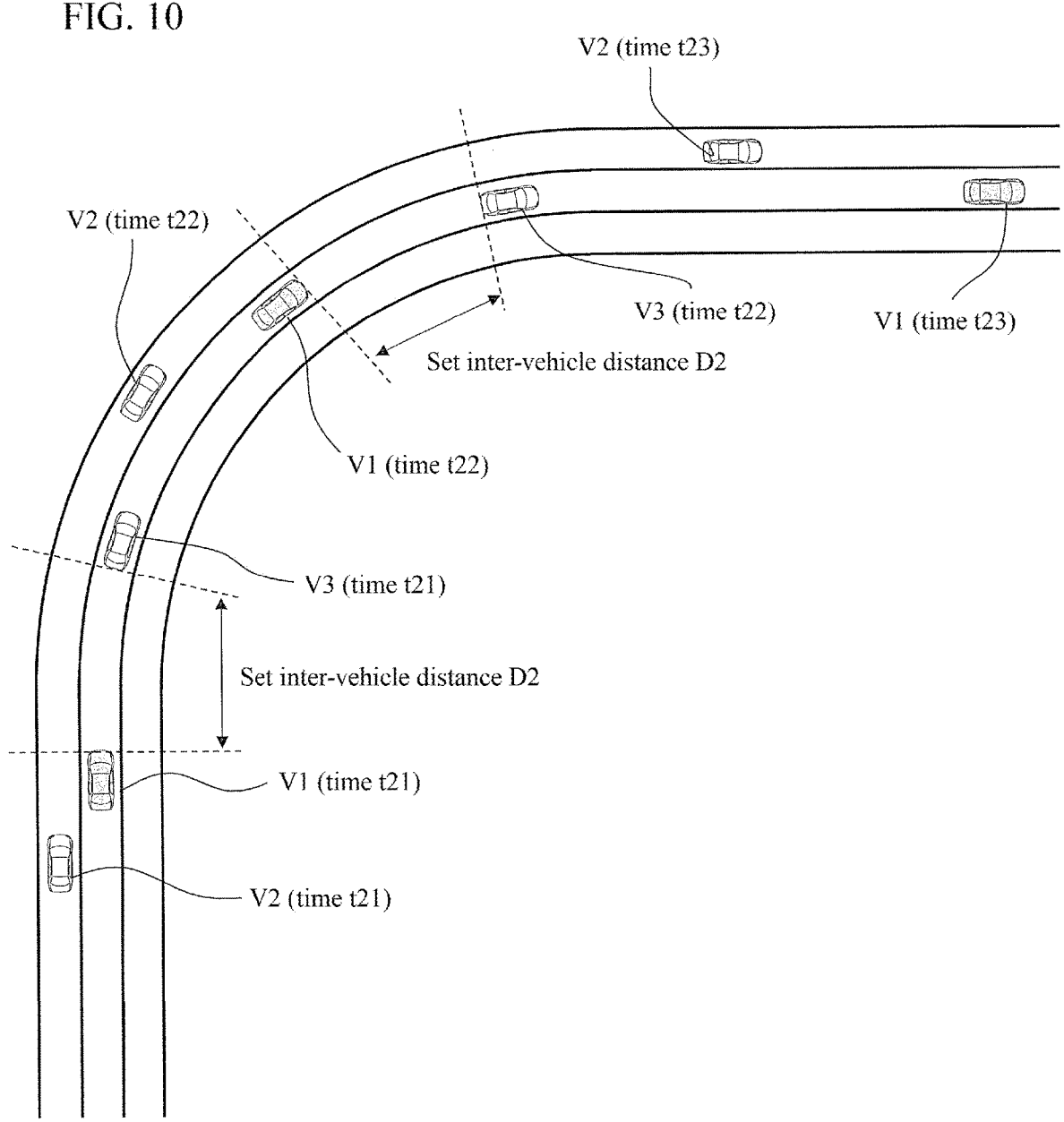
FIG. 10 is a plan view for describing a travel control method for the subject vehicle in the scene illustrated in FIG. 9.

Here, FIG. 9 is a plan view exemplifying a scene in which the subject vehicle V1 travels along a curve when a preceding vehicle V3 is present and FIG. 10 is a plan view for describing a travel control method for the subject vehicle V1 in the scene illustrated in FIG. 9. In the exemplary scene illustrated in FIG. 9, the current position of the subject vehicle V1 is P1, the current position of the forward adjacent vehicle V2 is P2, and the current position of the preceding vehicle V3 is P3. In this scene, the inter-vehicle distance control is performed such that the subject vehicle V1 is controlled to travel with the set inter-vehicle distance D2, which is preliminarily set by the driver, from the preceding vehicle V3. In this case, the passing completion position PT at which the subject vehicle V1 passes the forward adjacent vehicle V2 is estimated (step S107) on the basis of the current vehicle speed of the subject vehicle V1, the current vehicle speed of the forward adjacent vehicle V2, the relative positions of the subject vehicle V1 and the forward adjacent vehicle V2, etc. This passing completion position PT is a position at which the subject vehicle V1 completes passing the forward adjacent vehicle V2 while being controlled to travel with the inter-vehicle distance D2 from the preceding vehicle V3. In the exemplary scene illustrated in FIG. 9, the preceding vehicle V3 is present ahead of the subject vehicle V1 (step S108=Yes); therefore, a determination is made as to whether or not the subject vehicle V1 can pass the forward adjacent vehicle V2 before the curve located ahead while maintaining the inter-vehicle distance from the preceding vehicle V3 at D2 (step S113). In the exemplary scene illustrated in FIG. 9, the passing completion position PT is located before the curve arrival point PC (at a position nearer to the subject vehicle V1); therefore, a determination is made that the subject vehicle V1 can pass the forward adjacent vehicle V2 before the curve located ahead of the subject vehicle V1 while maintaining the inter-vehicle distance from the preceding vehicle V3 at D2 (step S113=Yes). Accordingly, the inter-vehicle distance from the preceding vehicle V3 is maintained at the set inter-vehicle distance D2 (step S114), and the inter-vehicle distance control is performed in which the subject vehicle V1 is controlled to travel so that the subject vehicle V1 is separated from the preceding vehicle V3 by the inter-vehicle distance D2 (step S112). Thus, as illustrated in FIG. 10, the inter-vehicle distance control is performed in which the subject vehicle V1 is controlled to travel so that the subject vehicle V1 is separated from the preceding vehicle V3 by the inter-vehicle distance D2, and the subject vehicle V1 can thereby be controlled to pass the forward adjacent vehicle V2 before the curve and travel along the curve without traveling side by side with the forward adjacent vehicle V2 when traveling along the curve.

Figure 11:
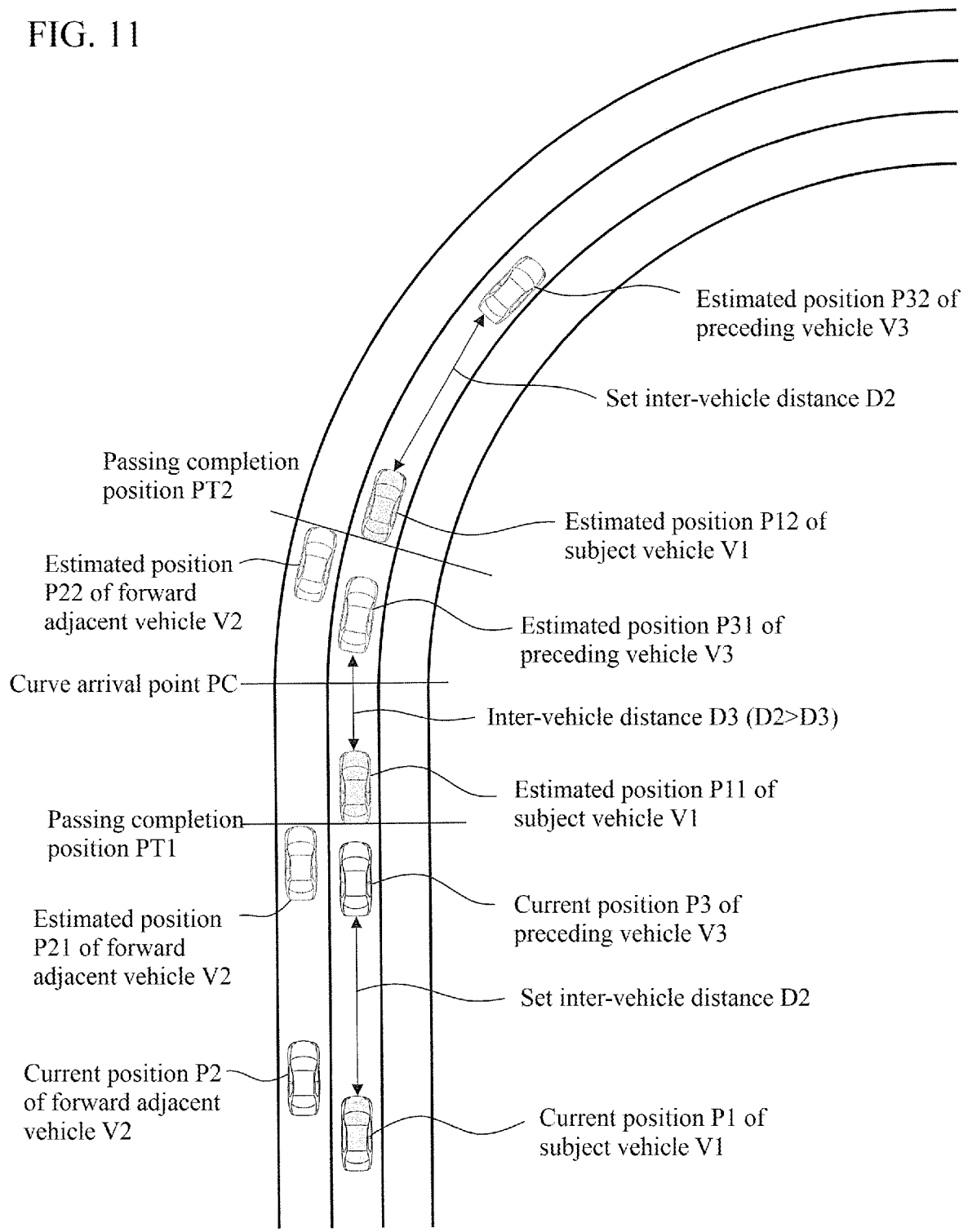
FIG. 11 is a plan view illustrating another scene in which the subject vehicle travels along a curve when a preceding vehicle is present.
Figure 12:
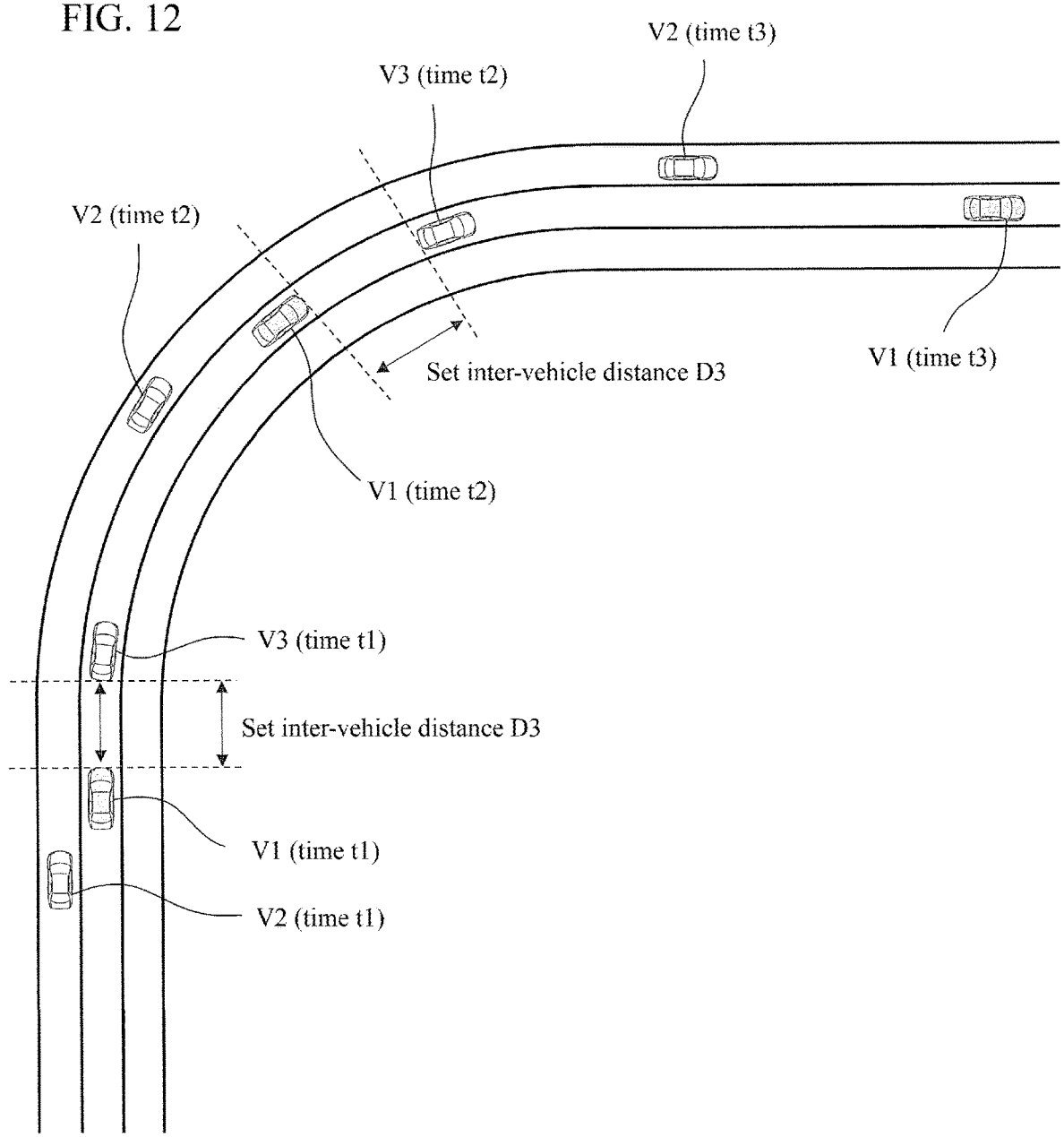
FIG. 12 is a plan view for describing a travel control method for the subject vehicle in the scene illustrated in FIG. 11.

FIG. 11 is a plan view exemplifying another scene in which the subject vehicle V1 travels along a curve when a preceding vehicle V3 is present and FIG. 12 is a plan view for describing a travel control method for the subject vehicle in the scene illustrated in FIG. 11. In the exemplary scene illustrated in FIG. 11, as in the exemplary scene illustrated in FIG. 9, the inter-vehicle distance control is performed such that the subject vehicle V1 is controlled to travel with the set inter-vehicle distance D2, which is preliminarily set by the driver, from the preceding vehicle V3. In the exemplary scene illustrated in FIG. 11, however, the passing completion position PT2, at which the subject vehicle V1 passes the forward adjacent vehicle V2 when the subject vehicle V1 is controlled to travel with the inter-vehicle distance D2 from the preceding vehicle V3, is located ahead of the curve arrival point PC (at a position farther from the subject vehicle V1); therefore, a determination is made that the subject vehicle V1 cannot pass the forward adjacent vehicle V2 before the curve located ahead of the subject vehicle V1 when the inter-vehicle distance from the preceding vehicle V3 is set to the set inter-vehicle distance D2 (step S113=No). Accordingly, a determination is made as to whether the subject vehicle V1 can pass the forward adjacent vehicle V2 before the curve located ahead of the subject vehicle V1 when the inter-vehicle distance from the preceding vehicle V3 is set to D3 shorter than the inter-vehicle distance D2 (step S115). In the exemplary scene illustrated in FIG. 11, the passing completion position PT is located before the curve arrival point PC (at a position nearer to the subject vehicle V1) when the inter-vehicle distance from the preceding vehicle V3 is set to D3 (<D2); therefore, a determination is made that the subject vehicle V1 can pass the forward adjacent vehicle V2 before the curve located ahead of the subject vehicle V1 when the inter-vehicle distance from the preceding vehicle V3 is set to D3 (step S115=Yes). The inter-vehicle distance from the preceding vehicle V3 is therefore changed to the distance D3 (step S116), and the inter-vehicle distance control is performed in which the subject vehicle V1 is controlled to travel so that the subject vehicle V1 is separated from the preceding vehicle V3 by the inter-vehicle distance D3 (step S112). Thus, as illustrated in FIG. 12, the inter-vehicle distance control is performed in which the subject vehicle V1 is controlled to pass the forward adjacent vehicle V2 before the curve and to travel so that the subject vehicle V1 is separated from the preceding vehicle V3 by the inter-vehicle distance D3 when traveling along the curve, and the subject vehicle V1 can thereby be controlled to travel along the curve without traveling side by side with the forward adjacent vehicle V2 when traveling along the curve.

Figure 13:
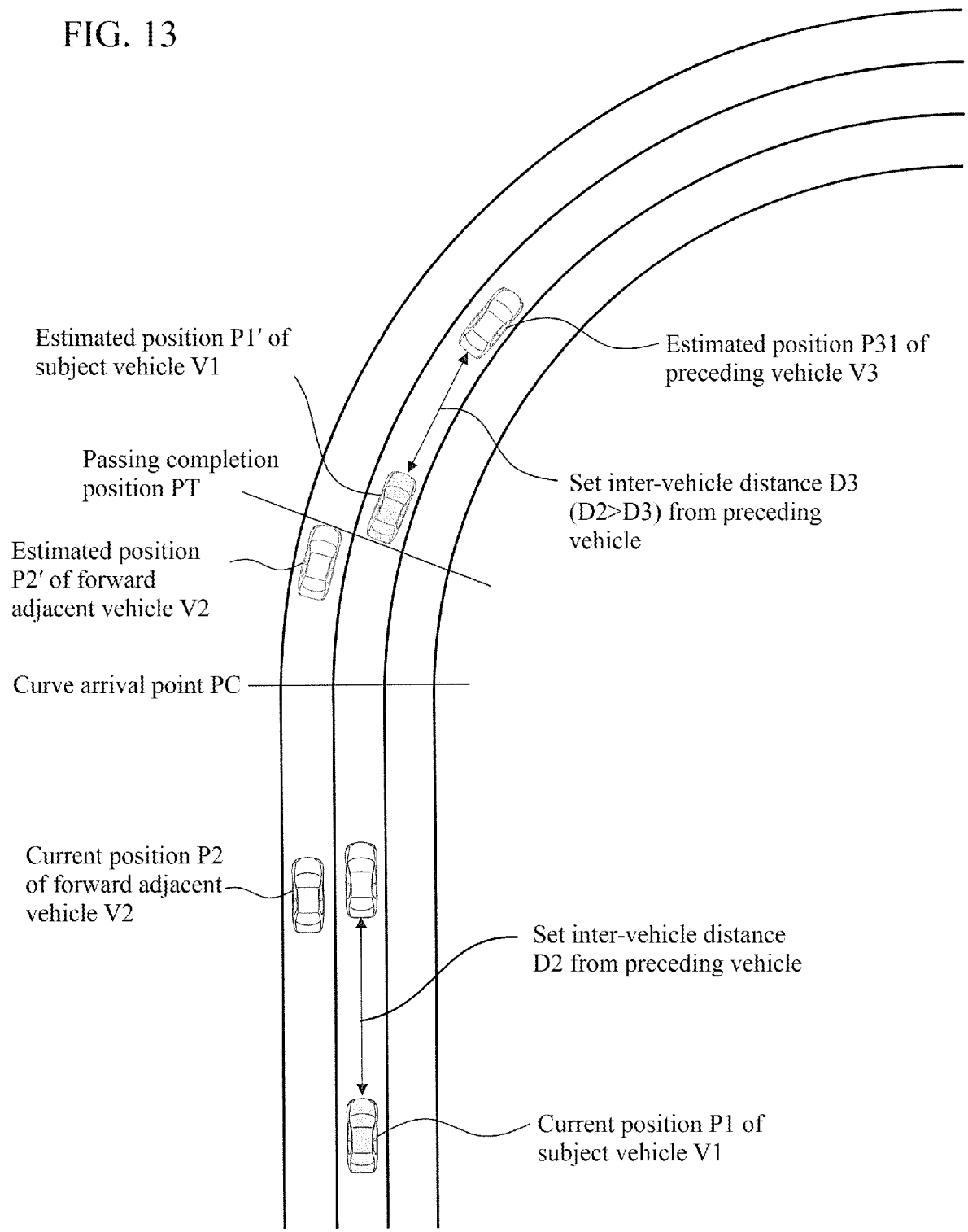
FIG. 13 is a plan view illustrating still another scene in which the subject vehicle travels along a curve when a preceding vehicle is present.
Figure 14:
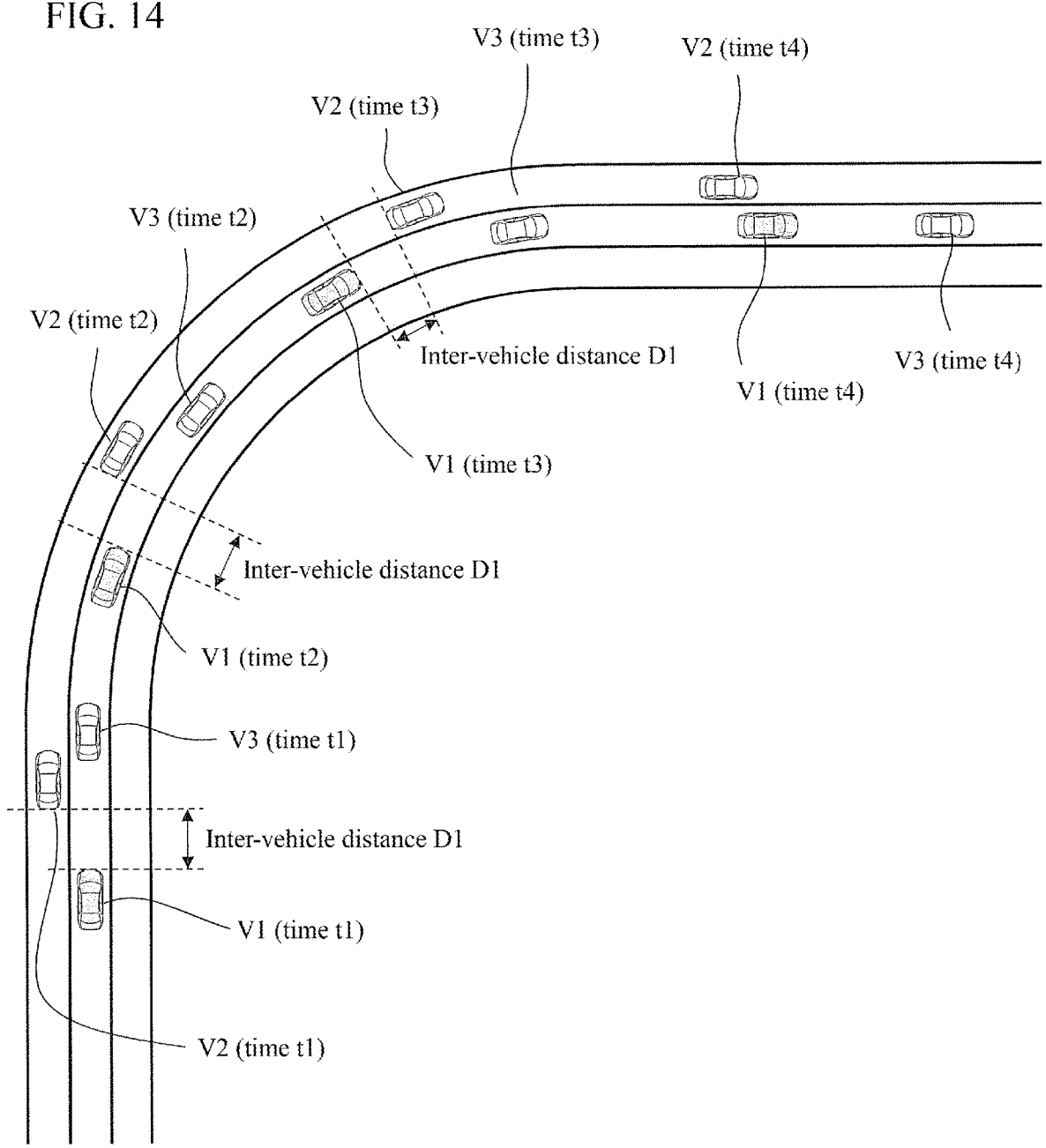
FIG. 14 is a plan view for describing a travel control method for the subject vehicle in the scene illustrated in FIG. 13.

FIG. 13 is a plan view exemplifying still another scene in which the subject vehicle V1 travels along a curve when a preceding vehicle V3 is present ahead in the traveling lane for the subject vehicle V1 and FIG. 14 is a plan view for describing a travel control method for the subject vehicle in the scene illustrated in FIG. 13. In the exemplary scene illustrated in FIG. 13, both in the case in which the inter-vehicle distance from the preceding vehicle V3 is set to the set inter-vehicle distance D2 and the case in which the inter-vehicle distance from the preceding vehicle V3 is set to D3 shorter than the set inter-vehicle distance D2, a determination is made that the subject vehicle V1 cannot pass the forward adjacent vehicle V2 before the curve located ahead (step S113=No, step S115=No). The inter-vehicle distance from the forward adjacent vehicle V2 is therefore set to D1. Then, the inter-vehicle distance control is performed in which the subject vehicle V1 is controlled to travel so that the subject vehicle V1 is separated from the forward adjacent vehicle V2 by the inter-vehicle distance D1 (step S112). Thus, as illustrated in FIG. 14, the inter-vehicle distance control is performed in which the subject vehicle V1 is controlled to travel so that the subject vehicle V1 is separated from the forward adjacent vehicle V2 by the inter-vehicle distance D1 when traveling along the curve, and the subject vehicle V1 can thereby be controlled to travel along the curve without traveling side by side with the forward adjacent vehicle V2 when traveling along the curve.

As described above, in the present embodiment, during the automated or autonomous travel control of the subject vehicle, when a curve is present ahead of the subject vehicle and a forward adjacent vehicle (another vehicle) is present on the side of the subject vehicle, such as in an adjacent lane to the traveling lane for the subject vehicle, a determination is made as to whether or not the subject vehicle and the forward adjacent vehicle are to travel side by side along the curve located ahead. Then, when a determination is made that the subject vehicle and the forward adjacent vehicle are to travel side by side along the curve, the inter-vehicle distance control is performed in which the inter-vehicle distance between the subject vehicle and the forward adjacent vehicle in the traveling direction of the subject vehicle is set to a predetermined distance D1 (>0) and the subject vehicle is controlled to travel with the set inter-vehicle distance. This allows the subject vehicle and the forward adjacent vehicle to be avoided from traveling side by side along the curve; therefore, during the travel along the curve in which fluctuation of the vehicles is relatively large, it is possible to dissipate the uneasy feeling which is given to the driver as the subject vehicle and the adjacent vehicle travel side by side.

Moreover, in the present embodiment, the passing completion position PT at which the subject vehicle passes the forward adjacent vehicle is estimated and a determination is made as to whether the estimated passing completion position PT is located before the curve arrival point PC (at a position nearer to the subject vehicle) or located ahead of the curve arrival point PC (at a position farther from the subject vehicle). Then, when the passing completion position PT is located before the curve arrival point PC, a determination is made that the subject vehicle can pass the forward adjacent vehicle before the curve, and the automated or autonomous travel control is executed in which the subject vehicle is controlled to pass the forward adjacent vehicle before the curve. Through this operation, not only the subject vehicle and the forward adjacent vehicle can be avoided from traveling side by side along the curve, but also the automated or autonomous speed control can be preferentially executed in which the subject vehicle is controlled to travel at the set speed in an automated or autonomous manner or the automated or autonomous distance control can be preferentially executed in which the subject vehicle is controlled to follow the preceding vehicle with the set distance in an automated or autonomous manner. On the other hand, when the passing completion position is located ahead of the curve arrival point (at a position farther from the subject vehicle), a determination is made that the subject vehicle cannot pass the forward adjacent vehicle before the curve, and the inter-vehicle distance control is performed in which the inter-vehicle distance between the subject vehicle and the forward adjacent vehicle in the traveling direction of the subject vehicle is set to a predetermined distance D1 (≥0) and the subject vehicle is controlled to travel with the set inter-vehicle distance. This allows the subject vehicle and the forward adjacent vehicle to be avoided from traveling side by side along the curve.

Moreover, in the present embodiment, when a preceding vehicle traveling ahead in a lane in which the subject vehicle travels is present, a determination is made as to whether or not the subject vehicle can pass the forward adjacent vehicle before the curve while maintaining the set inter-vehicle distance, which is set by the driver, between the subject vehicle and the preceding vehicle. Then, when a determination is made that the subject vehicle can pass the forward adjacent vehicle before the curve while maintaining the set inter-vehicle distance, which is set by the driver, between the subject vehicle and the preceding vehicle, the automated or autonomous travel control is executed in which the subject vehicle is controlled to pass the forward adjacent vehicle before the curve. Through this operation, even when a preceding vehicle is present, the subject vehicle and the forward adjacent vehicle can be avoided from traveling side by side during the travel along the curve.

Moreover, in the present embodiment, provided that a preceding vehicle traveling ahead in a lane in which the subject vehicle travels is present, even when a determination is made that the subject vehicle cannot pass the forward adjacent vehicle before the curve while maintaining the set inter-vehicle distance, which is set by the driver, between the subject vehicle and the preceding vehicle, but when a determination is made that the subject vehicle can pass the forward adjacent vehicle before the road section by setting the inter-vehicle distance from the preceding vehicle to a shorter value than the current value, the automated or autonomous travel control is executed in which the inter-vehicle distance from the preceding vehicle is set to that shorter value and the subject vehicle is controlled to pass the forward adjacent vehicle before the curve. Through this operation, not only the subject vehicle and the forward adjacent vehicle can be avoided from traveling side by side along the curve, but also the automated or autonomous distance control can be preferentially executed in which, when a preceding vehicle is present, the subject vehicle is controlled to follow the preceding vehicle with the set distance in an automated or autonomous manner.

Furthermore, in the present embodiment, the curvature radius threshold is varied in accordance with the variation amount in the lateral position of the forward adjacent vehicle, and the subject vehicle and the forward adjacent vehicle can thereby be suppressed from coming close to each other as the degree of fluctuation of the forward adjacent vehicle increases. Thus, by taking into account the actual situation of the curve which cannot be read from the map database 120, it is possible to accurately select the curve which needs the countermeasure by the inter-vehicle distance control of the present embodiment.

Next, the travel control apparatus and method according to another embodiment of the present invention will be described. The travel control apparatus 100 according to the present embodiment has the same configuration as that of the travel control apparatus 100 of the embodiment illustrated in FIG. 1, and the present embodiment is the same as the above-described embodiment except that the travel control apparatus 100 of the present embodiment operates as follows, so the configuration of the travel control apparatus 100 is borrowed herein. In the above-described embodiment, the inter-vehicle distance control with respect to the forward adjacent vehicle is executed in a curve, but the inter-vehicle distance control of the present invention can also be applied to a narrow road in addition to a curve. The travel control process according to the present embodiment will be described below with reference to FIG. 15.

Steps S301 to S304 are executed as in steps S101 to S104 of the embodiment illustrated in FIG. 2. That is, the subject vehicle information and the ambient information are acquired (steps S301 and S302) and a forward adjacent vehicle and a preceding vehicle are specified (step S303). When a forward adjacent vehicle is present (step S304), the process proceeds to step S305.

Figure 16:
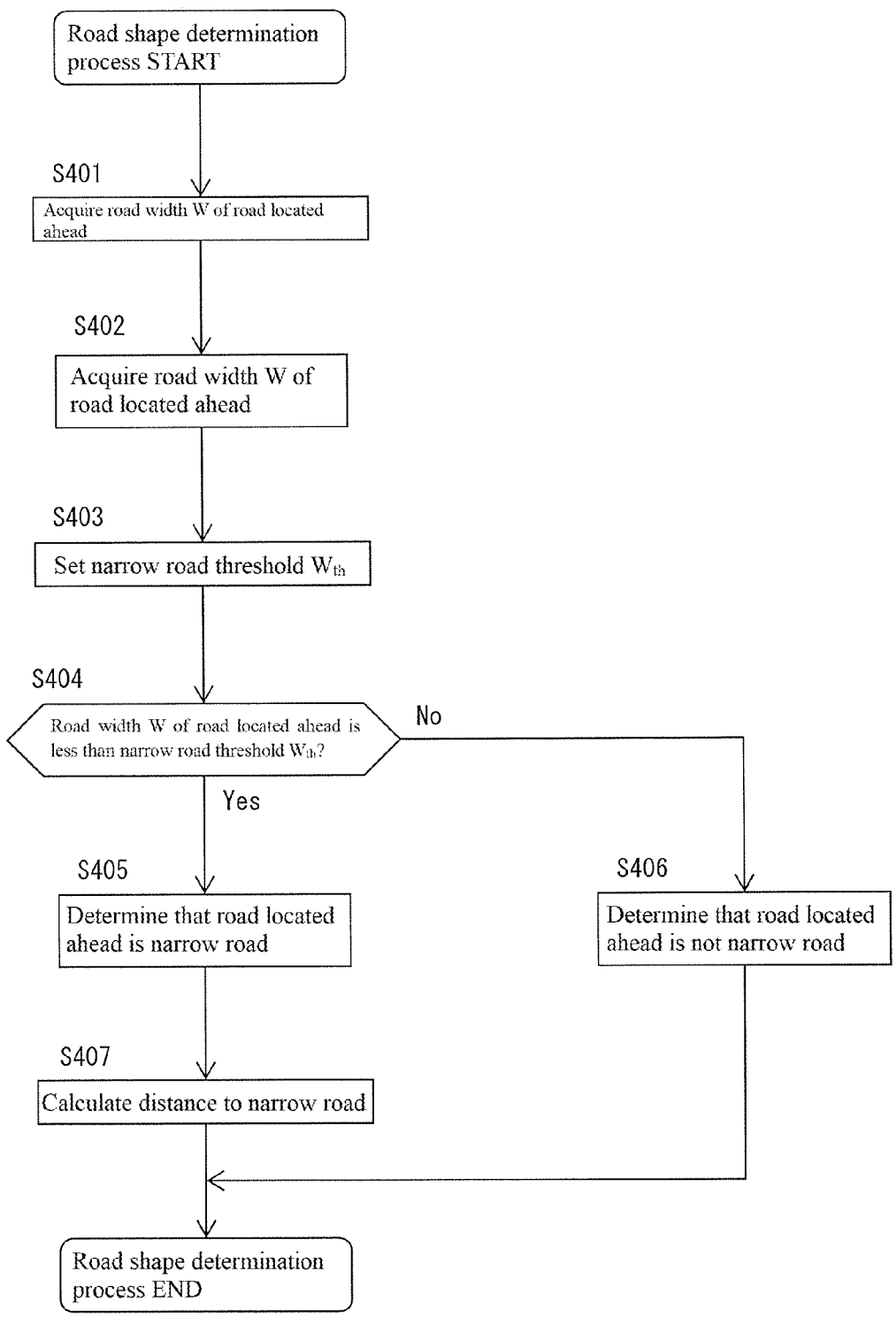
FIG. 16 is a flowchart illustrating the subroutine of a road shape determination process of FIG. 15.

In step S305, the road shape determination function serves to perform a road shape determination process of determining whether or not the road located ahead of the subject vehicle is a narrow road. Here, FIG. 16 is a flowchart illustrating the road shape determination process according to the present embodiment.

In step S401, the road shape determination function serves first to acquire a road width W of the road located ahead of the subject vehicle. For example, the road shape determination function can serve to refer to the current position of the subject vehicle and the map database 120 and thereby to acquire the road width W of the road located ahead of the subject vehicle.

In step S402, the road shape determination function serves to acquire a vehicle width B of the forward adjacent vehicle on the basis of the ambient information acquired in step S302. For example, the road shape determination function can be configured to detect the vehicle width B of the forward adjacent vehicle on the basis of an image captured by the camera 150.

In step S403, the road shape determination function serves to set a narrow road threshold $W_{th}$. In the present embodiment, the road shape determination function serves first to calculate a ratio (B/W) of the vehicle width B of the forward adjacent vehicle V2 acquired in step S402 to the road width W of the road located ahead acquired in step S401. Then, the road shape determination function serves to set the narrow road threshold $W_{th}$ in accordance with the ratio (B/W) of the vehicle width B of the forward adjacent vehicle V2 to the road width W of the road located ahead.

Figure 17:
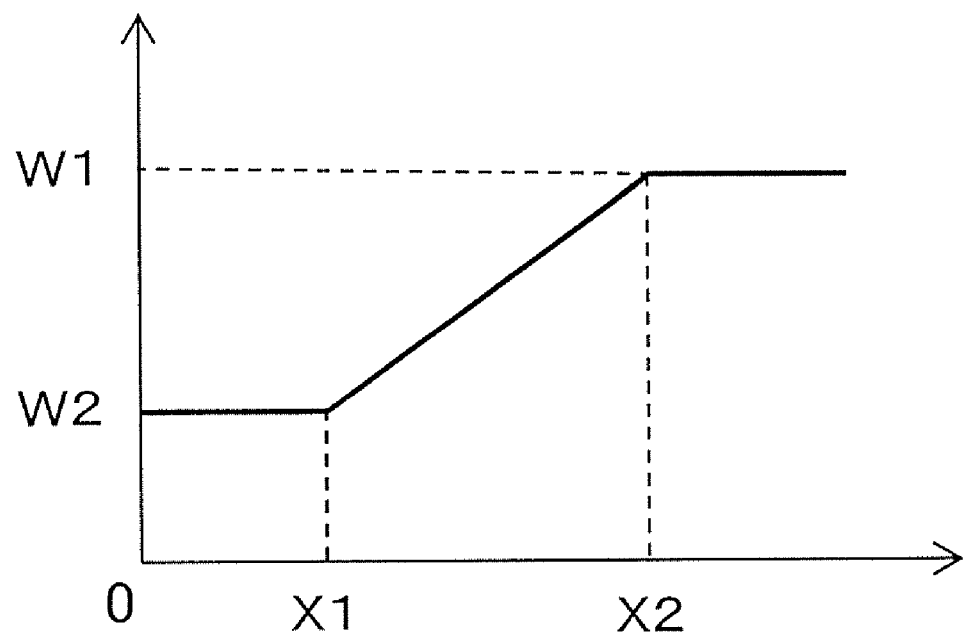
FIG. 17 is a graph (control map) illustrating an example of the relationship between a ratio of the vehicle width of a forward adjacent vehicle to the road width of a road located ahead and a narrow road threshold.

FIG. 17 is a graph (control map) illustrating an example of the relationship between the ratio (B/W) of the vehicle width B of the forward adjacent vehicle V2 to the road width W of the road located ahead and the narrow road threshold $W_{th}$. As illustrated in FIG. 17, when the ratio (B/W) of the vehicle width B of the forward adjacent vehicle V2 to the road width W of the road located ahead is less than X1, the road shape determination function serves to set the narrow road threshold $W_{th}$ to W2. When the ratio (B/W) of the vehicle width B of the forward adjacent vehicle V2 to the road width W of the road located ahead is X1 or more and less than X2, the road shape determination function serves to set the narrow road threshold $W_{th}$ such that the narrow road threshold $W_{th}$ increases in proportion to the ratio (B/W) within a range from W2 to W1. When the ratio (B/W) of the vehicle width B of the forward adjacent vehicle V2 to the road width W of the road located ahead is X2 or more, the road shape determination function serves to set the narrow road threshold $W_{th}$ to W1. X1, X2, W1, and W2 are not particularly limited and can be appropriately set by experiments or the like. Thus, the narrow road threshold $W_{th}$ is set larger as the ratio B/W increases (the road width W is smaller and/or the vehicle width B is larger); therefore, the frequency that the road is determined as a narrow road becomes high as the vehicle width B increases even with the same road width W and/or as the road width W decreases even with the same vehicle width B.

In step S404 of FIG. 16, the road shape determination function serves to make a determination as to whether or not the road width W of the road located ahead of the subject vehicle, which is acquired in step S401, is less than the narrow road threshold $W_{th}$ which is set in step S403. When the road width W of the road located ahead of the subject vehicle is less than the narrow road threshold $W_{th}$, the process proceeds to step S405, in which the road shape determination function serves to determine that the road located ahead of the subject vehicle is a narrow road. On the other hand, when the road width W of the road located ahead of the subject vehicle is not less than the narrow road threshold $W_{th}$, the process proceeds to step S406, in which the road shape determination function serves to determine that the road located ahead of the subject vehicle is not a narrow road.

The determination made in step S405 that the road located ahead of the subject vehicle is a narrow road is followed by step S407, in which the road shape determination function serves to calculate a distance from the current position of the subject vehicle to a narrow road arrival point located ahead of the subject vehicle. After the road shape determination process illustrated in FIG. 16 is completed, the process proceeds to step S306 illustrated in FIG. 15.

Figure 15:
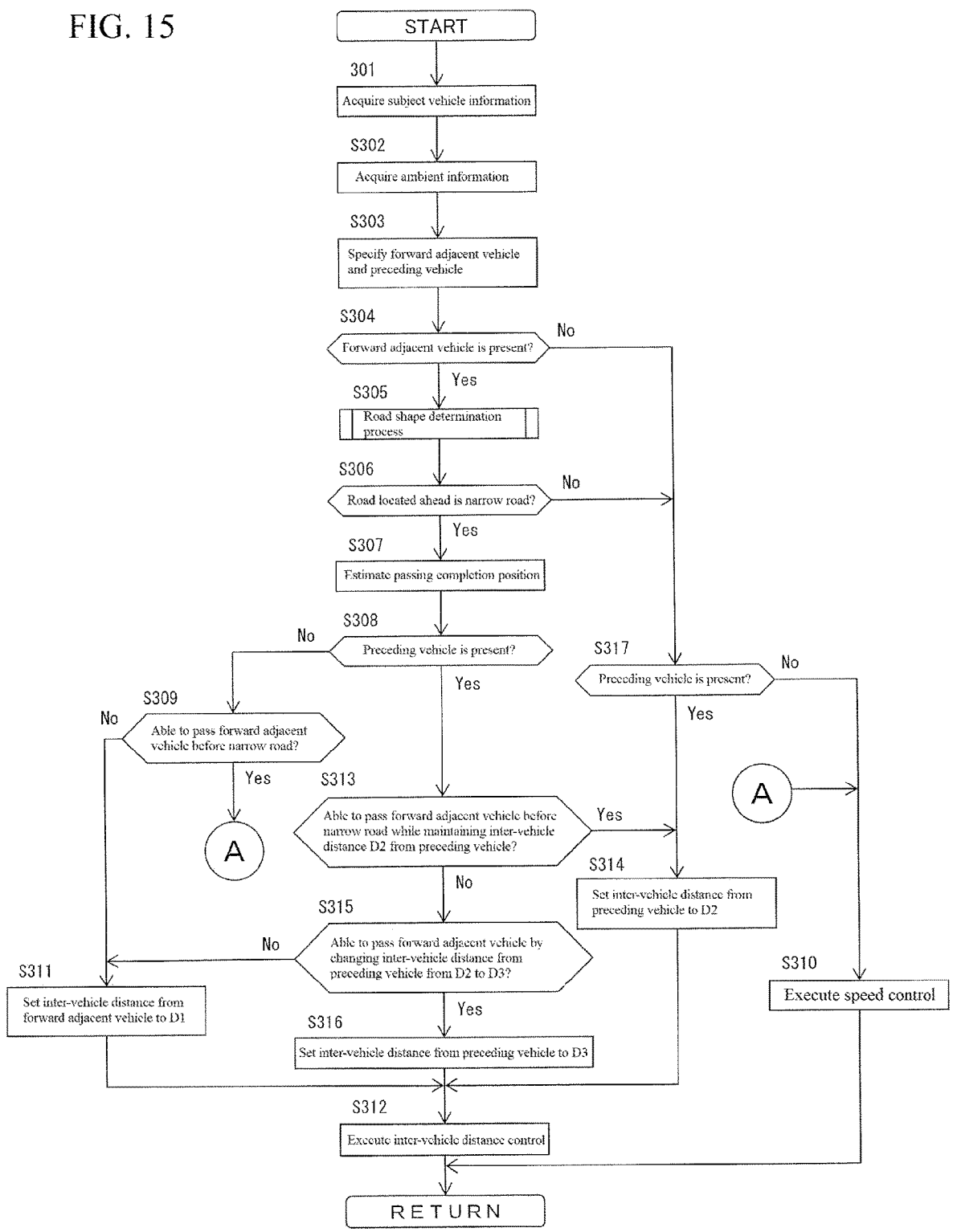
FIG. 15 is a flowchart illustrating a travel control process according to another embodiment of the present invention.

In step S306 of FIG. 15, the passing determination function serves to make a determination as to whether or not the road located ahead of the subject vehicle is a narrow road, on the basis of the determination result obtained in the road shape determination process of step S305. In the road shape determination process illustrated in FIG. 16, when a determination is made that the road located ahead of the subject vehicle is a narrow road (step S405), the process proceeds to step S307, while when a determination is made that the road located ahead of the subject vehicle is not a narrow road (step S406), the process proceeds to step S317.

In steps S307 and S308, as in steps S107 and S108 of the embodiment illustrated in FIG. 2, the passing completion position is estimated at which the subject vehicle passes the forward adjacent vehicle if the subject vehicle and the forward adjacent vehicle travel at respective current vehicle speeds (step S307), and a determination is made as to whether or not a preceding vehicle is present ahead of the subject vehicle (step S308).

Then, when a determination is made that no preceding vehicle is present, the process proceeds to step S309, in which the passing determination function serves to determine whether or not the subject vehicle can pass the forward adjacent vehicle at the current traveling speed of the subject vehicle before the narrow road located ahead. Specifically, the passing determination function serves to determine whether or not the position estimated in step S307 at which the subject vehicle passes the forward adjacent vehicle is located before the narrow road arrival point located ahead of the subject vehicle. Then, when the position at which the subject vehicle passes the forward adjacent vehicle is located before the narrow road arrival point located ahead of the subject vehicle, a determination is made that the subject vehicle can pass the forward adjacent vehicle before the narrow road located ahead. If the position at which the subject vehicle passes the forward adjacent vehicle cannot be estimated due to a slower vehicle speed of the subject vehicle than the vehicle speed of the forward adjacent vehicle, a determination is made that the subject vehicle cannot pass the forward adjacent vehicle before the narrow road located ahead.

The determination that the subject vehicle can pass the forward adjacent vehicle before the narrow road located ahead is followed by step S310. In step S310, as in step S110 of the first embodiment, the speed control is performed in which the subject vehicle is controlled to travel at the set vehicle speed which is set by the driver. On the other hand, the determination that the subject vehicle cannot pass the forward adjacent vehicle before the narrow road located ahead when the subject vehicle is controlled to travel at the current vehicle speed is followed by step S311. In steps S311 and S312, as in steps S111 and S112 of the embodiment illustrated in FIG. 2, the inter-vehicle distance between the subject vehicle and the forward adjacent vehicle is set to a predetermined distance D1 (step S311), and the inter-vehicle distance control is performed in which the subject vehicle is controlled to travel with the inter-vehicle distance D1 from the forward adjacent vehicle (step S312).

When a determination is made in step S308 that a preceding vehicle is present, the process proceeds to step S313. In step S313, the passing determination function serves to determine whether or not the subject vehicle can pass the forward adjacent vehicle before the narrow road while maintaining the inter-vehicle distance from the preceding vehicle at an inter-vehicle distance D2 that is preliminarily set. When a determination is made that the subject vehicle can pass the forward adjacent vehicle before the narrow road, the process proceeds to step S314. In step S314, as in step S114 of the embodiment illustrated in FIG. 2, the set inter-vehicle distance for the subject vehicle remains as D2. On the other hand, when a determination is made that the subject vehicle cannot pass the forward adjacent vehicle before the narrow road while maintaining the inter-vehicle distance D2, the process proceeds to step S315, in which the passing determination function serves to determine whether or not the subject vehicle can pass the forward adjacent vehicle before the narrow road if the inter-vehicle distance between the preceding vehicle and the subject vehicle is changed to D3 shorter than the set inter-vehicle distance D2. When the subject vehicle can pass the forward adjacent vehicle before the narrow road, the process proceeds to step S316, from which, as in steps S116 and S112 of the embodiment illustrated in FIG. 2, the set inter-vehicle distance for the subject vehicle is changed to D3 (step S316) and the inter-vehicle distance control is performed in which the subject vehicle is controlled to travel with the inter-vehicle distance D3 from the preceding vehicle (step S312). On the other hand, when the subject vehicle cannot pass the forward adjacent vehicle before the narrow road even with the inter-vehicle distance D3, the process proceeds to step S311, from which, as in steps S111 and S112 of the embodiment illustrated in FIG. 2, the set inter-vehicle distance from the forward adjacent vehicle is set to D1 (step S311) and the inter-vehicle distance control is performed in which the subject vehicle is controlled to travel to follow the forward adjacent vehicle (step S312).

As described above, according to the present embodiment, during the automated or autonomous travel control of the subject vehicle, when a narrow road is present ahead of the subject vehicle and a forward adjacent vehicle is present on the side of the subject vehicle, such as in an adjacent lane to the traveling lane for the subject vehicle, a determination is made as to whether or not the subject vehicle and the forward adjacent vehicle are to travel side by side along the narrow road. Then, when a determination is made that the subject vehicle and the forward adjacent vehicle are to travel side by side along the narrow road, the inter-vehicle distance control is performed in which the inter-vehicle distance between the subject vehicle and the forward adjacent vehicle in the traveling direction of the subject vehicle is set to a predetermined distance D1 (>0) and the subject vehicle is controlled to travel with the set inter-vehicle distance. This allows the subject vehicle and the forward adjacent vehicle to be avoided from traveling side by side along the narrow road and it is therefore possible to dissipate the uneasy feeling which is given to the driver as the subject vehicle and the adjacent vehicle travel side by side along the narrow road having a relatively narrow road width.

Moreover, in the present embodiment, the narrow road threshold $W_{th}$ is set in accordance with the ratio (B/W) of the vehicle width B of the forward adjacent vehicle V2 to the road width W of the road located ahead and it is therefore possible to accurately select the narrow road which needs the countermeasure by the inter-vehicle distance control of the present embodiment.

In the above-described embodiments, a configuration is exemplified in which, when the subject vehicle can pass the forward adjacent vehicle before the curve or narrow road, the subject vehicle is controlled to pass the forward adjacent vehicle before the curve or narrow road rather than performing the inter-vehicle distance control of setting the inter-vehicle distance between the subject vehicle and the forward adjacent vehicle to D1. However, the present invention is not limited to this configuration and another configuration may also be employed in which, for example, a determination is not made as to whether or not the subject vehicle can pass a forward adjacent vehicle before the curve or narrow road and, during execution of the automated or autonomous travel control, when an adjacent vehicle is present on the side of the subject vehicle and a curve or a narrow road is present ahead of the subject vehicle, the inter-vehicle distance control is performed to set the inter-vehicle distance between the subject vehicle and the forward adjacent vehicle to D1. Also in this case, the subject vehicle and the adjacent vehicle can be avoided from traveling side by side along the curve or narrow road and it is therefore possible to dissipate the uneasy feeling which is given to the driver as the subject vehicle and the adjacent vehicle travel side by side along the curve or narrow road.

In the above-described embodiments, a configuration is exemplified in which, when a forward adjacent vehicle is present ahead of the subject vehicle on its side, a determination is made as to whether or not the subject vehicle can pass the forward adjacent vehicle before the curve or narrow road. However, the present invention is not limited to this configuration and another configuration may also be employed in which, for example, when the subject vehicle travels on a straight road side by side with an adjacent vehicle traveling in an adjacent lane, a determination is made as to whether or not the subject vehicle can pass the forward adjacent vehicle before the curve or narrow road. In addition or alternatively, still another configuration may also be employed in which, when a rearward adjacent vehicle is present behind the subject vehicle on its side, a determination is made as to whether or not the rearward adjacent vehicle can pass the subject vehicle before the curve or narrow road and, when the rearward adjacent vehicle cannot pass the subject vehicle before the curve or narrow road, the subject vehicle is controlled to travel during the travel along the curve or narrow road so that the subject vehicle is separated from the rearward adjacent vehicle by a distance that is a predetermined distance or more in the traveling direction of the subject vehicle. That is, the present invention is not limited to being applied to a forward adjacent vehicle traveling ahead of the subject vehicle on its side and, when an adjacent vehicle is present ahead of the subject vehicle on its side, present just beside the subject vehicle, or present behind the subject vehicle on its side, a determination is made that the adjacent vehicle is present "on the side" of the subject vehicle, and the inter-vehicle distance control is performed in which the subject vehicle is controlled to travel during the travel along the curve or narrow road so that the subject vehicle is separated from the adjacent vehicle by a distance that is a predetermined distance or more in the traveling direction of the subject vehicle.

In the above-described embodiments, a configuration is exemplified in which the curvature radius of the road located ahead is compared with the curvature radius threshold thereby to determine whether or not the road located ahead is a curve. However, the present invention is not limited to this configuration and another configuration may also be employed in which, for example, the curvature of the road located ahead is compared with a curvature threshold thereby to determine whether or not the road located ahead is a curve.

In the above-described embodiments, the control device 180 corresponds to the controller of the present invention, the forward adjacent vehicle V2 corresponds to another vehicle of the present invention, the curve and narrow road correspond to the road section of the present invention, and the curve arrival point and narrow road arrival point correspond to the starting point of the road section of the present invention.

DESCRIPTION OF REFERENCE NUMERALS

100 Travel control apparatus
110 Subject vehicle position detection device
120 Map database
130 Vehicle speed sensor
140 Ranging sensor
150 Camera
160 Input device
170 Drive mechanism
180 Control device

The invention claimed is:

1. A travel control method for a vehicle, comprising:
when, during autonomous travel control of a subject vehicle, a road section including at least one of a curve and a narrow road is present ahead of the subject vehicle and another vehicle is traveling in an adjacent lane to a traveling lane for the subject vehicle and ahead of the subject vehicle, estimating a position at which the subject vehicle passes the other vehicle, on a basis of a traveling speed of the subject vehicle, a traveling speed of the other vehicle, and an inter-vehicle distance between the subject vehicle and the other vehicle;
when the position is located at a position farther from the subject vehicle than a starting point of the road section, determining that the subject vehicle cannot pass the other vehicle before the road section and executing inter-vehicle distance control in which the subject vehicle is controlled to travel with an inter-vehicle distance that is set such that the subject vehicle and the other vehicle do not travel side by side when the subject vehicle travels in the road section; and when the position is located at a position nearer to the subject vehicle than the starting point of the road section, determining that the subject vehicle can pass the other vehicle before the road section and executing the autonomous travel control in which the subject vehicle is controlled to pass the other vehicle.

2. The travel control method for a vehicle according to claim 1, comprising:

when a preceding vehicle traveling ahead in the traveling lane for the subject vehicle is present, determining whether or not the subject vehicle can pass the other vehicle before the road section while maintaining at least a current inter-vehicle distance from the preceding vehicle, on a basis of the traveling speed of the subject vehicle, a traveling speed of the preceding vehicle, an inter-vehicle distance between the subject vehicle and the preceding vehicle, and the estimated position at which the subject vehicle passes the other vehicle; and when a determination is made that the subject vehicle can pass the other vehicle, executing the autonomous travel control in which the subject vehicle is controlled to pass the other vehicle before the road section while maintaining the current inter-vehicle distance from the preceding vehicle.

3. The travel control method for a vehicle according to claim 2, comprising:

when a determination is made that the subject vehicle cannot pass the other vehicle, setting the inter-vehicle distance from the preceding vehicle to a shorter value than the current inter-vehicle distance thereby to determine whether or not the subject vehicle can pass the other vehicle before the road section; and when a determination is made that the subject vehicle can pass the other vehicle, setting the inter-vehicle distance from the preceding vehicle to the shorter value and executing the autonomous travel control in which the subject vehicle is controlled to pass the other vehicle before the road section.

4. The travel control method for a vehicle according to claim 1, comprising:

acquiring a curvature radius of a road located ahead of the subject vehicle;

determining that the road located ahead is a curve included in the road section when the curvature radius is less than a curvature radius threshold;

detecting a variation amount in a lateral position of the other vehicle during a certain period; and when the variation amount in the lateral position is a predetermined value or more, setting the curvature radius threshold to a larger value than that when the variation amount in the lateral position is less than the predetermined value.

5. The travel control method for a vehicle according to claim 1, comprising:

acquiring a road width of a road located ahead of the subject vehicle;

determining that the road located ahead of the subject vehicle is a narrow road included in the road section when the road width is less than a narrow road threshold;

detecting a ratio of a vehicle width of the other vehicle to the road width; and when the ratio is a predetermined value or more, setting the narrow road threshold to a larger value than that when the ratio is less than the predetermined value.

6. A travel control method for a vehicle, comprising:

when, during autonomous travel control of a subject vehicle, a road section including at least one of a curve and a narrow road is present ahead of the subject vehicle, another vehicle is traveling in an adjacent lane to a traveling lane for the subject vehicle and ahead of the subject vehicle, and a preceding vehicle traveling ahead in the traveling lane for the subject vehicle is present, estimating a position at which the subject vehicle passes the other vehicle, on a basis of a traveling speed of the subject vehicle, a traveling speed of the other vehicle, and an inter-vehicle distance between the subject vehicle and the other vehicle; and determining whether or not the subject vehicle can pass the other vehicle before the road section while maintaining at least a current inter-vehicle distance from the preceding vehicle, on a basis of the traveling speed of the subject vehicle, a traveling speed of the preceding vehicle, an inter-vehicle distance between the subject vehicle and the preceding vehicle, and the estimated position at which the subject vehicle passes the other vehicle; and when the position at which the subject vehicle passes the other vehicle is located at a position nearer to the subject vehicle than a starting point of the road section and a determination is made that the subject vehicle can pass the other vehicle before the road section while maintaining at least the current inter-vehicle distance from the preceding vehicle, executing the autonomous travel control in which the subject vehicle is controlled to pass the other vehicle before the road section while maintaining the current inter-vehicle distance from the preceding vehicle; and canceling inter-vehicle distance control in which the subject vehicle is controlled to travel with an inter-vehicle distance that is set such that the subject vehicle and the other vehicle do not travel side by side when the subject vehicle travels in the road section.

7. The travel control method for a vehicle according to claim 6, comprising:

when a determination is made that the subject vehicle cannot pass the other vehicle, setting the inter-vehicle distance from the preceding vehicle to a shorter value than the current inter-vehicle distance thereby to determine whether or not the subject vehicle can pass the other vehicle before the road section; and when a determination is made that the subject vehicle can pass the other vehicle, setting the inter-vehicle distance from the preceding vehicle to the shorter value and executing the autonomous travel control in which the subject vehicle is controlled to pass the other vehicle before the road section.

8. A travel control method for a vehicle wherein, when, during autonomous travel control of a subject vehicle, a road section including a curve is present ahead of the subject vehicle and another vehicle is traveling in an adjacent lane to a traveling lane for the subject vehicle, inter-vehicle distance control is executed in which the subject vehicle is controlled to travel with an inter-vehicle distance that is set such that the subject vehicle and the other vehicle do not travel side by side when the subject vehicle travels in the road section, the travel control method for a vehicle comprising:

acquiring a curvature radius of a road located ahead of the subject vehicle;

determining that the road located ahead is a curve included in the road section when the curvature radius is less than a curvature radius threshold;

detecting a variation amount in a lateral position of the other vehicle during a certain period; and when the variation amount in the lateral position is a predetermined value or more, setting the curvature radius threshold to a larger value than that when the variation amount in the lateral position is less than the predetermined value.

9. A travel control method for a vehicle wherein, when, during autonomous travel control of a subject vehicle, a road section including a narrow road is present ahead of the subject vehicle and another vehicle is traveling in an adjacent lane to a traveling lane for the subject vehicle, inter-vehicle distance control is executed in which the subject vehicle is controlled to travel with an inter-vehicle distance that is set such that the subject vehicle and the other vehicle do not travel side by side when the subject vehicle travels in the road section, the travel control method for a vehicle comprising:

acquiring a road width of a road located ahead of the subject vehicle;

determining that the road located ahead is a narrow road included in the road section when the road width is less than a narrow road threshold;

detecting a ratio of a vehicle width of the other vehicle to the road width; and when the ratio is a predetermined value or more, setting the narrow road threshold to a larger value than that when the ratio is less than the predetermined value.

10. A travel control apparatus for a vehicle, comprising a controller configured to control travel of a subject vehicle in an autonomous manner, the controller being further configured to:

when, during autonomous travel control of the subject vehicle, a road section including at least one of a curve and a narrow road is present ahead of the subject vehicle and another vehicle is traveling in an adjacent lane to a traveling lane for the subject vehicle and ahead of the subject vehicle, estimate a position at which the subject vehicle passes the other vehicle, on a basis of a traveling speed of the subject vehicle, a traveling speed of the other vehicle, and an inter-vehicle distance between the subject vehicle and the other vehicle;

when the position is located at a position farther from the subject vehicle than a starting point of the road section, determine that the subject vehicle cannot pass the other vehicle before the road section and execute inter-vehicle distance control in which the subject vehicle is controlled to travel with an inter-vehicle distance that is set such that the subject vehicle and the other vehicle do not travel side by side when the subject vehicle travels in the road section; and when the position is located at a position nearer to the subject vehicle than the starting point of the road section, determine that the subject vehicle can pass the other vehicle before the road section and execute the autonomous travel control in which the subject vehicle is controlled to pass the other vehicle.

\* \* \* \* \*